(12) United States Patent
Bao

(10) Patent No.: US 12,142,957 B2
(45) Date of Patent: Nov. 12, 2024

(54) CHARGING STATION WITH RETRACTABLE HOLDING MEMBER

(71) Applicant: Yuyao Yuchang Electrical Appliance Co., Ltd., Yuyao (CN)

(72) Inventor: Yong Bao, Yuyao (CN)

( * ) Notice: Subject to any disclaimer, the term of this patent is extended or adjusted under 35 U.S.C. 154(b) by 414 days.

(21) Appl. No.: 17/558,518

(22) Filed: Dec. 21, 2021

(65) Prior Publication Data
US 2023/0198273 A1  Jun. 22, 2023

(51) Int. Cl.
*H01M 10/46* (2006.01)
*H02J 7/00* (2006.01)

(52) U.S. Cl.
CPC .......... *H02J 7/0044* (2013.01); *H02J 7/0013* (2013.01)

(58) Field of Classification Search
CPC ...... H02J 7/0044; H02J 7/0042; H02J 50/005; H02J 50/10; H02J 7/0013; H02J 7/0045; Y02T 10/70; Y02T 10/7072

USPC ................ 320/107, 108, 114, 115
See application file for complete search history.

(56) References Cited

U.S. PATENT DOCUMENTS

2016/0315496 A1* 10/2016 Barnard ............... H02J 7/0044
2017/0201106 A1*  7/2017 Mecca ................. H02J 7/0013

FOREIGN PATENT DOCUMENTS

CN           212183145 U   * 12/2020

* cited by examiner

*Primary Examiner* — Edward Tso
(74) *Attorney, Agent, or Firm* — Tsz Lung Yeung

(57) ABSTRACT

A charging station includes a power supply member supplying power and a case. The case includes a case body and a holding member. The charging station has a retracting state and an outstretching state. In the retracting state, the holding member is retracted to the case body. In the outstretching state, the holding member is outstretched from the case body to hold a second electrical device and the second electrical device is capable of obtaining power from the power supply member.

20 Claims, 26 Drawing Sheets

A-A

B-B

C-C

D-D

E-E

F-F

G-G

H-H

J-J

K-K

L-L

M-M

N-N

O-O

P-P

Q-Q

CHARGING STATION WITH RETRACTABLE HOLDING MEMBER

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to a charging station, and more particularly to a charging station which is used to both a portable light and a mobile phone.

Description of Related Arts

Wireless charging is currently a popular direction for development and research in the field of electric energy transmission. The use of wireless charging to charge becomes portable, so it is welcomed by consumers.

Lamps are common tools in daily life. They can convert electrical energy into light energy and are suitable for providing light in a dark environment. Portable work lights are one type of lamps, and portable work lights can be used portable. Users can carry portable work lights to various environments based on their needs, such as outdoors, garages and other environments. The battery life of a portable work light is an important performance. One of the major problems users have when using a portable work light is that the portable work light cannot work due to lack of energy.

The emergence of portable external power storage devices such as power banks allows the battery life of portable work lights to be extended. At present, there are power banks that can be applied to lamps on the market. For the convenience of use, wireless power banks have also appeared.

The wireless power bank applied to the lamp is usually equipped with a magnet to fix the lamp on the wireless power bank by magnetic attraction, so as to help maintain the alignment between the wireless power bank and the lamp, which is beneficial to the electricity transferring between the wireless power bank and the lamp. Further, in order to match the use environment of the portable work light, the wireless power bank can also be hung in a predetermined position, so that the work light can be maintained at a desired height. Take the garage as an example for illustration. Users working in the garage need to get light. And when the power of the lamp itself is insufficient, the user can hang the wireless power bank in a preset position, and then install the lamp to the wireless power bank for charging, and the lamp can also radiate light to the desired position.

Furthermore, in addition to wireless lamps, there are many other devices that can be wireless charged, such as mobile phones. However, the current wireless power bank applied to lamps has a single application scenario and cannot be applied to complex mobile electronic devices. As we all know, most mobile phones currently on the market cannot be held laterally on a vertical surface by magnetic attraction. Therefore, the current power bank for lamps can only simply meet the charging requirements of the lamps, and it is difficult to meet the charging requirements of other charging devices, especially mobile phones. Users working in garages may need to carry at least two power banks, wherein one power bank is used to power lamps and the other power bank is used to power a mobile phones and other electronic devices, that is not portable for users.

SUMMARY OF THE PRESENT INVENTION

The invention is advantageous in that it provides a charging station which can not only charge a work light, but also charge a mobile phone.

Another advantage of the invention is to provide a multi-purpose charging station being adapted to be applied in workshops to facilitate the workers in the workshops.

Another advantage of the invention is to provide a charging station which provide a holding room for receiving a mobile electronic device.

Another advantage of invention is to provide a charging station which provide a holding room for holding a mobile electronic device in a vertical method.

Another advantage of the invention is to provide a charging station which is able to hold a work light and a mobile phone.

Another advantage of the invention is to provide a charging station which has a first state in which the charging station is capable of holding a work light and a second state in which the charging station is capable of holding a mobile phone.

Another advantage of the invention is to provide a charging station which has a first state for charging a working light and a second state for holding a mobile device in vertical charging method.

Another advantage of the invention is to provide a charging station which is adapted to be installed on the wall in such a manner that the charging station is attached to the wall to save space and facilitate the use of tool lights that are attached to the charging station.

Another advantage of the present invention is to provide a charging station suitable for installation on a wall in such a manner that the charging station is attached to the wall to save space and facilitate access to the mobile phone held in the charging station.

Another advantage of the invention is to provide a charging station which has a retracting state and an outstretching state, wherein in the first state, the charging station is suitable for charging a tool lamp, and the charged tool lamp is kept on the side of the charging station, so that the light emitted by the tool lamp is not blocked by the charging station, wherein in the outstretching state, the charging station is suitable for charging a mobile phone, and the charged mobile phone is firmly held in a holding slot, so as to prevent falling and convenient for the user to take.

Another advantage of the invention is to provide a charging station, wherein the charging station is multi-purpose, which can help different electric devices to charge.

Another advantage of the invention is to provide a multi-purpose charging station being adapted to be applied in workshops to facilitate the workers in the workshops.

Additional advantages and features of the invention will become apparent from the description which follows, and may be realized by means of the instrumentalities and combinations particularly pointing out in the appended claims.

According to the present invention, the foregoing and other objects and advantages are attained by a charging station which is capable of charging at least one first electrical device and is capable of charging at least one second electrical device, comprising:

a power supply member supplying power; and a case comprising a case body and a holding member, wherein the case body has at least one charging surface, said power supply member supplying power is installed in the case body;

wherein the charging station has a retracting state and an outstretching state, wherein in the outstretching state, the holding member is outstretched from the case body to form a holding room between the charging surface and the holding member, so that the second electrical device being held in the holding room for receiving power from the power supply member, wherein in the retracting state, the holding member is retracted to said case body, so that the first electrical device is capable of being attached to the charging surface for receiving power from the power supply member.

According to a embodiment of the present invention, the charging station further comprises a driving member, wherein the driving member is received in the case body, wherein the driving member operationally connected with the holding member, wherein when the driving member is moved out of the case body, the holding member is driven to outstretch from the case body by the driving member, wherein when the driving member is moved to the case boy, holding member is driven to retract into the case body.

According to a embodiment of the present invention, wherein the driving member further comprising a guiding member and at least a positioning element, wherein the positioning element is integrally protruded from the holding member, wherein the guiding member guides the at least a positioning element to move for guiding the holding member to switch between the retracting state and outstretching state.

According to a embodiment of the present invention, wherein the guiding member has at least one limiting oblique slot, wherein the at least one positioning element is embedded into the at least one limiting oblique slot, wherein when the guiding member is driven to move, the at least one positioning element is guided to move in the at least one limiting oblique slot for driving the holding member to move.

According to a embodiment of the present invention, wherein the moving direction of the guiding member and the moving direction of the holding member are vertical.

According to a embodiment of the present invention, wherein the guiding member further comprises an operating portion, the operation portion is connected with an end portion of the guiding member, wherein the operation portion is located in a corner portion of the case body.

According to a embodiment of the present invention, wherein the driving member further comprises an elastic element, wherein the elastic element is connected the operation portion and the case body, wherein the elastic element drives the guiding member move towards the case body so as to the holding member is driven to move towards the case body.

According to a embodiment of the present invention, wherein the driving member further comprises a motor fixed on the case body, wherein the motor is on the guiding member for driving the guiding member to move.

According to a embodiment of the present invention, wherein the guiding member further comprise a toothed bar structure located in a surface of the guiding member, wherein the driving member further comprises a gear, said gear is rotationally connected with the motor and the toothed bar structure, wherein the motor drives the guiding member to move through the gear rotating move on the toothed bar structure.

According to a embodiment of the present invention, wherein the holding member further comprises a bearing base and a holding arm integrally connected to the bearing base, wherein the at least a positioning element is integrally protruded from the holding member.

According to a embodiment of the present invention, wherein the bearing base further comprises at least one base arm, wherein the case body has at least one extending channel, the at least one base arm is passed through the at least one extending channel to connect to the guiding member.

According to a embodiment of the present invention, wherein the holding member further comprises a bearing base and a holding arm integrally connected to the bearing base, wherein the at least a positioning element is integrally protruded from the holding member.

According to a embodiment of the present invention, wherein the reinforcing element further defines a rotating hole and a sliding slot, wherein the rotation hole is connected to the case body, the sliding slot is connected to the holding member, wherein the holding member is move against the case body, the holding member sliding move along the sliding slot.

According to a embodiment of the present invention, the case further comprises at least one reinforcing element connected with the case body and the holding member.

According to a embodiment of the present invention, wherein the holding arm has an outer surface, wherein the holding member in the retracting state, the outer surface of the holding arm and the charging surface are coplanar.

According to another aspect of the present invention, the present invention provides a case for a charging station which is adapted to attach at least one first electrical device and is adapted to hold at least one second electrical device, comprising a case comprising a case body and a holding member, wherein the charging station has a retracting state and an outstretching state, wherein in the retracting state, the holding member is retracted to said case body, so as to provide a charging surface for the first electrical device, wherein in the outstretching state, the holding member is outstretched from the case body to hold the second electrical device.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Those skilled in the art should understand that, in the disclosure of the present invention, terminologies of "longitudinal," "lateral," "upper," "front," "back," "left," "right," "perpendicular," "horizontal," "top," "bottom," "inner," "outer," and etc. that indicate relations of directions or positions are based on the relations of directions or positions shown in the appended drawings, which are only to facilitate descriptions of the present invention and to simplify the descriptions, rather than to indicate or imply that the referred device or element is limited to the specific direction or to be operated or configured in the specific direction. Therefore, the above-mentioned terminologies shall not be interpreted as confine to the present invention.

Referring to FIG. 1 to FIG. 13 of the drawings, a charging station according to a first preferred embodiment of the present invention is illustrated. The charging station comprises a power supply member 10 and a case 20. The power supply member 10 is installed in the case 20. The case 20 comprises a case body 21 and a holding member 22.

Figure 1:
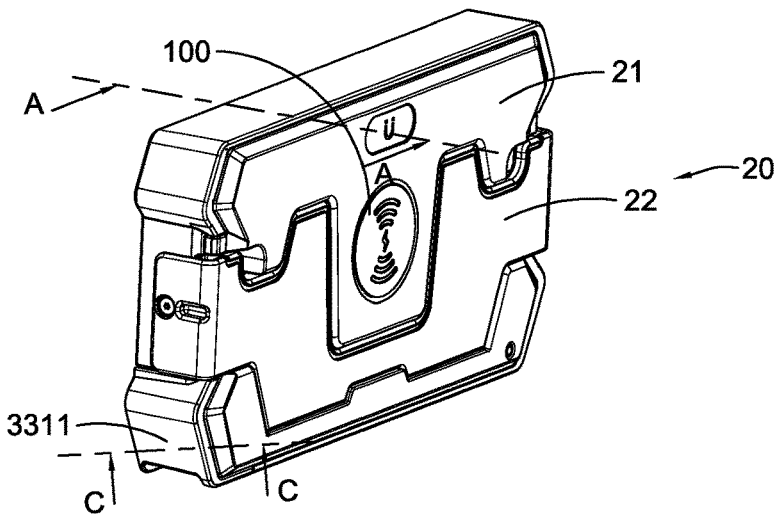
FIG. 1 is a perspective view of a charging station according to a first preferred embodiment of the present invention, illustrating a retracting state of the charging station.
Figure 2:
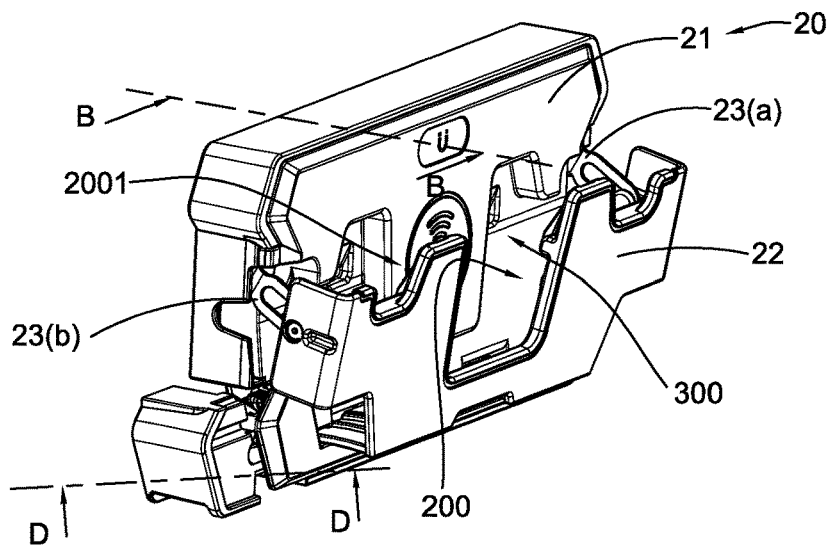
FIG. 2 is another perspective view of the charging station according to the above first preferred embodiment of the present invention, illustrating an outstretching state of the charging station.

The charging case has a retracting state and an outstretching state. In the retracting state, the holding member 22 is retracted to the case body 21, so as to form a charging surface 100, as shown in FIG. 1. In the outstretching state, the holding member 22 is outstretched from the case body 21, so as to form a holding room 200, as shown in FIG. 2.

Figure 12:
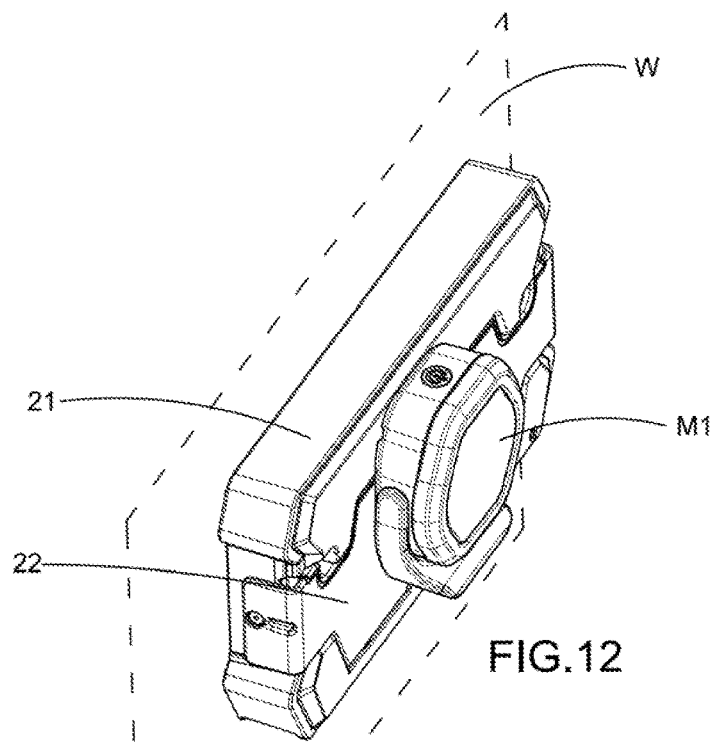
FIG. 12 is a perspective view of the charging station according to the above first preferred embodiment of the present invention, illustrating a first using state of the charging station.
Figure 13:
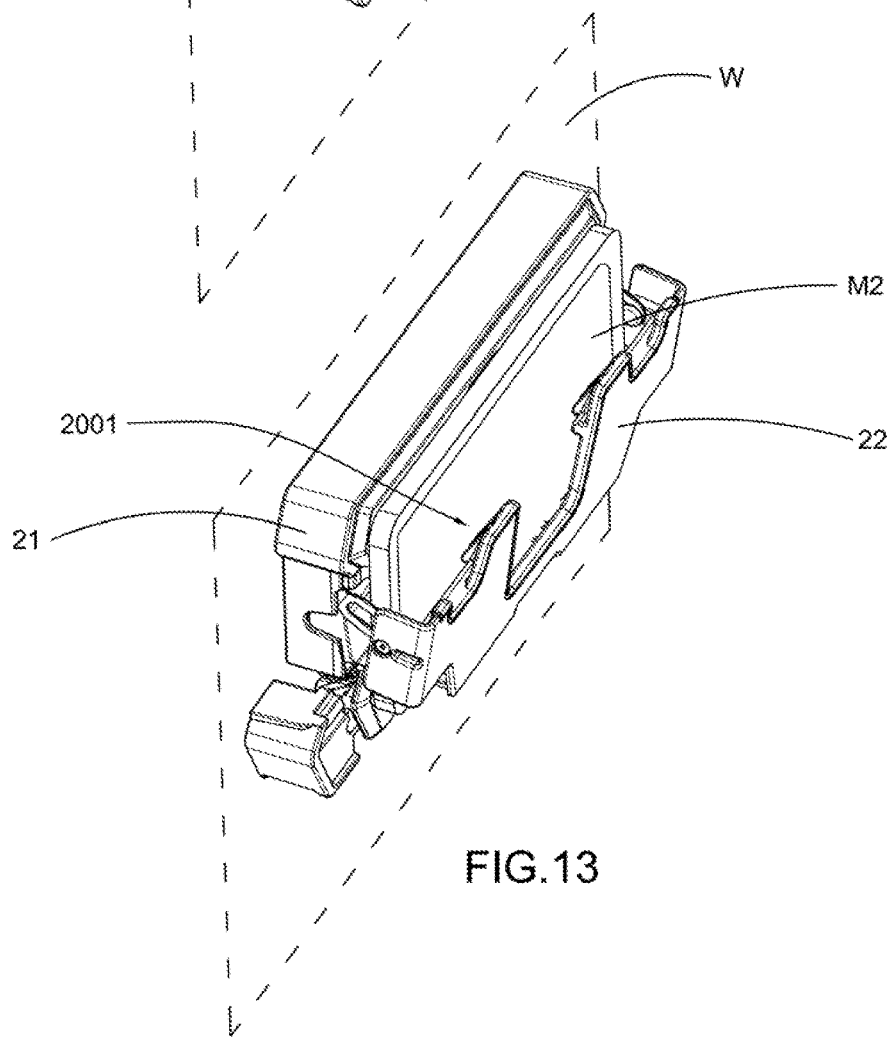
FIG. 13 is a perspective view of the charging station according to the above first preferred embodiment of the present invention, illustrating a second using state of the charging station.

Referring to FIG. 12 of the drawings, in the retracting state, a first electrical device M1 is capable of being kept to the charging surface 100 and obtaining power from the power supply member 10. Referring to FIG. 13 of the drawings, in the outstretching state, a second electrical device M2 is capable of being held into the holding room 200 and obtaining power from the power supply member 10.

Figure 4:
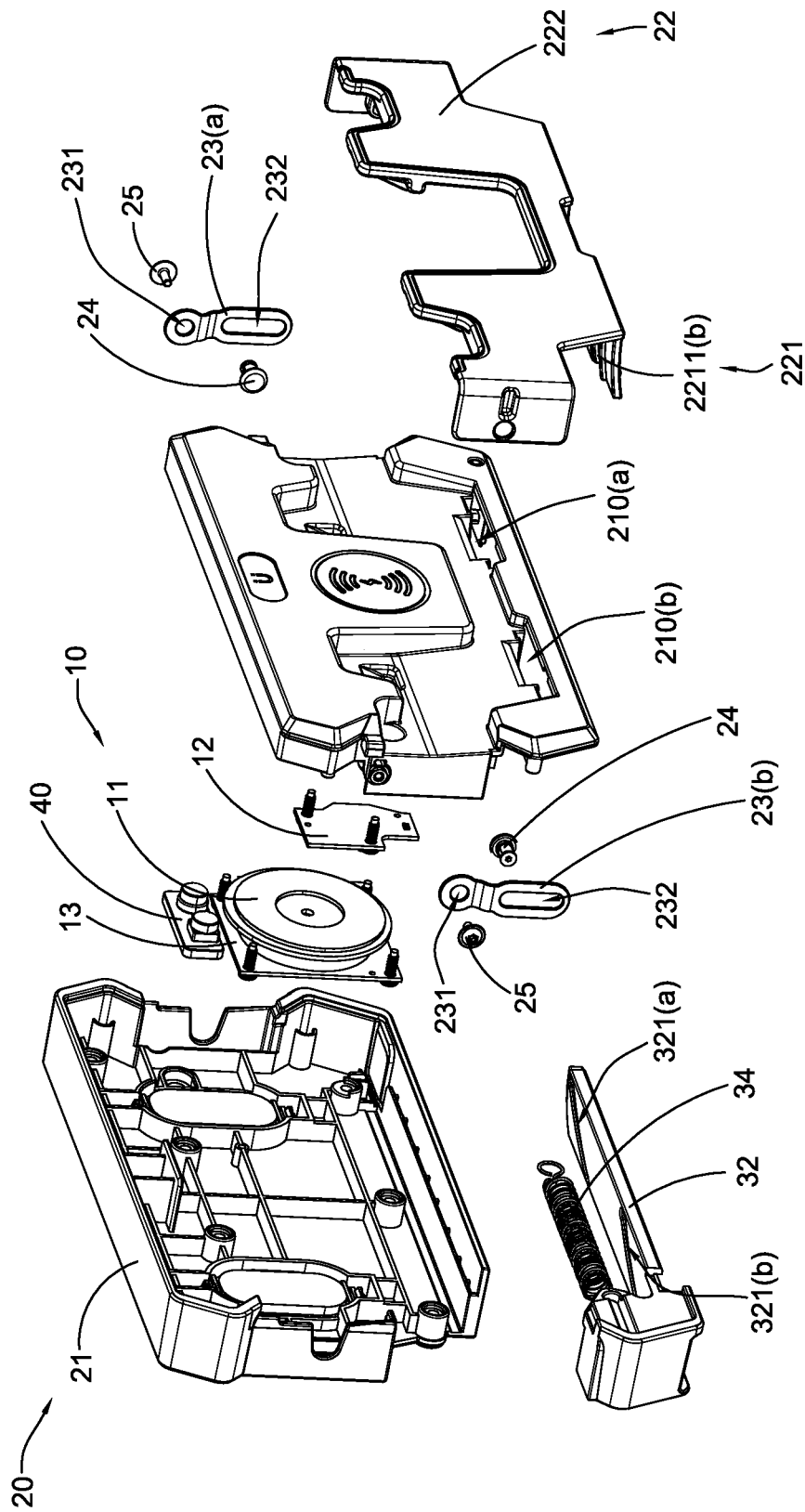
FIG. 4 is an exploded view of the charging station according to the above first preferred embodiment of the present invention.
Figure 5:
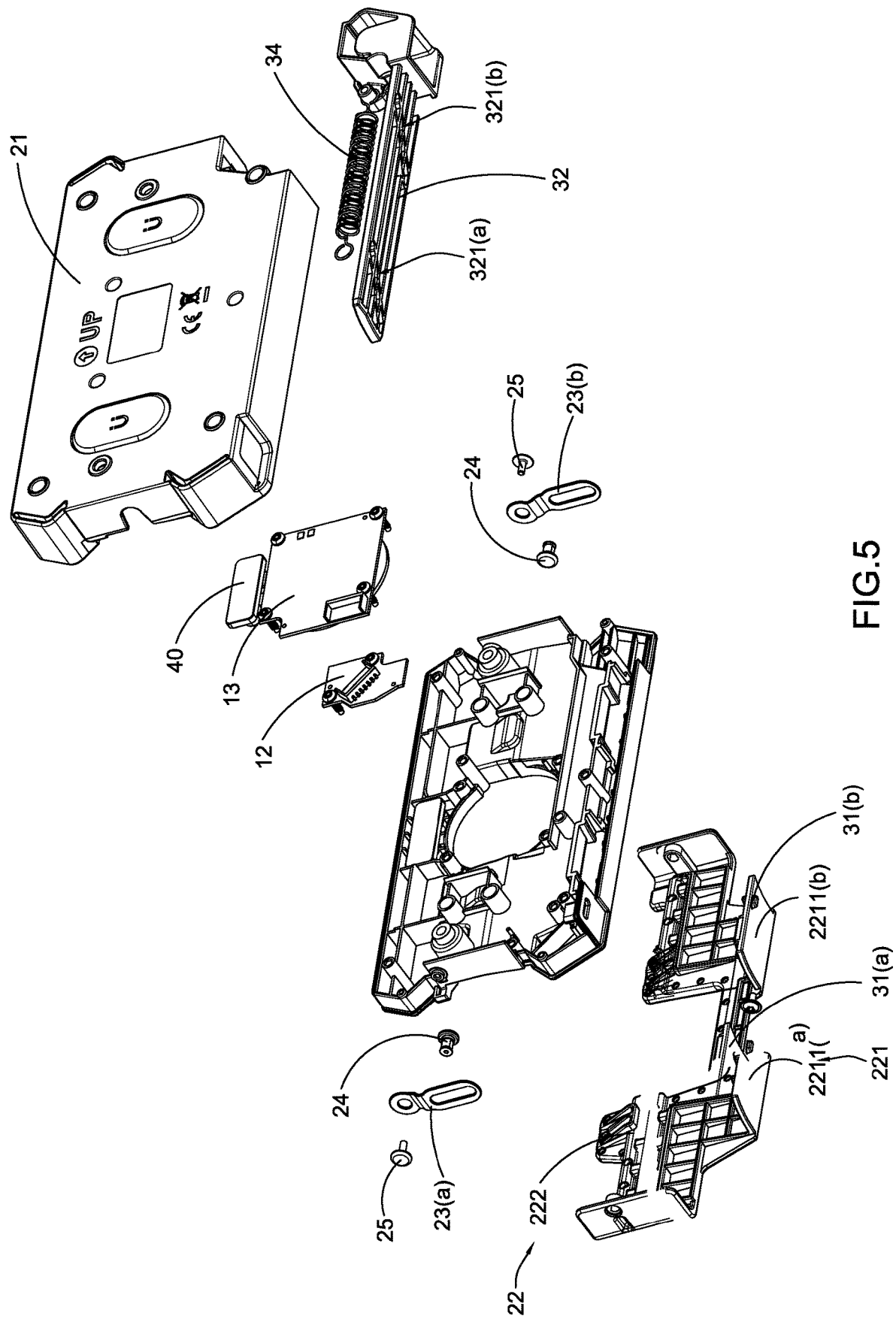
FIG. 5 is another exploded view of the charging station according to the above first preferred embodiment of the present invention.
Figure 6:
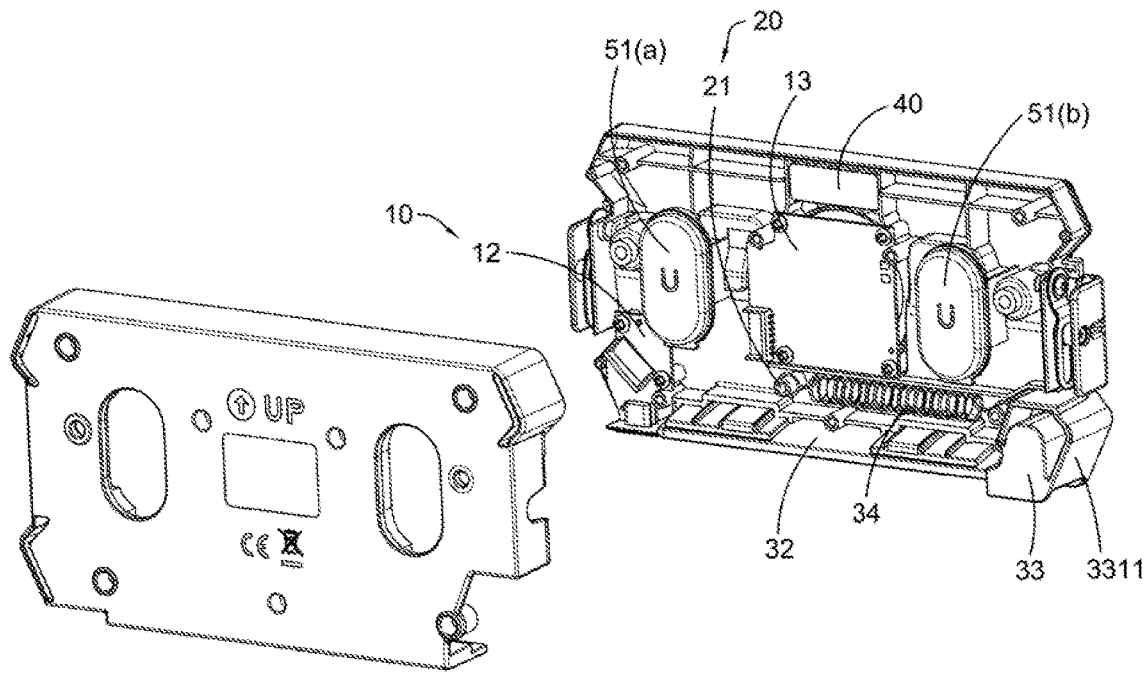
FIG. 6 is another exploded view of the charging station according to the above first preferred embodiment of the present invention.
Figure 9:
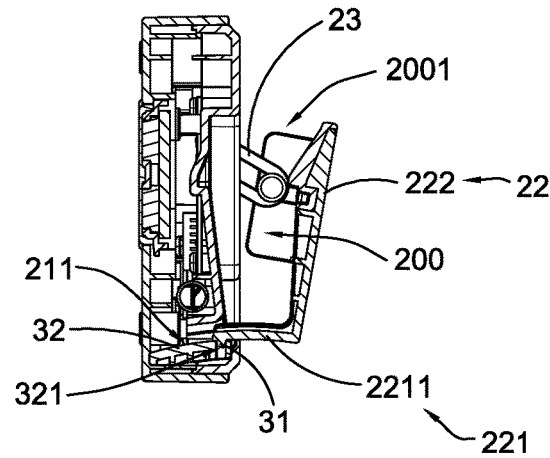
FIG. 9 is a sectional view along line B-B of FIG. 2.

As shown in FIG. 4 and FIG. 5 of the drawings, the holding member 22 comprises a bearing base 221 and a holding arm 222 integrally connected to the bearing base 221. Referring to FIG. 9 and FIG. 13 of the drawings, in the outstretching state of the charging station, the second electrical device M2 is borne to the bearing base 221 and held by the holding arm 222, so that the second electrical device M2 is firmly held to the holding room 200.

Figure 7:
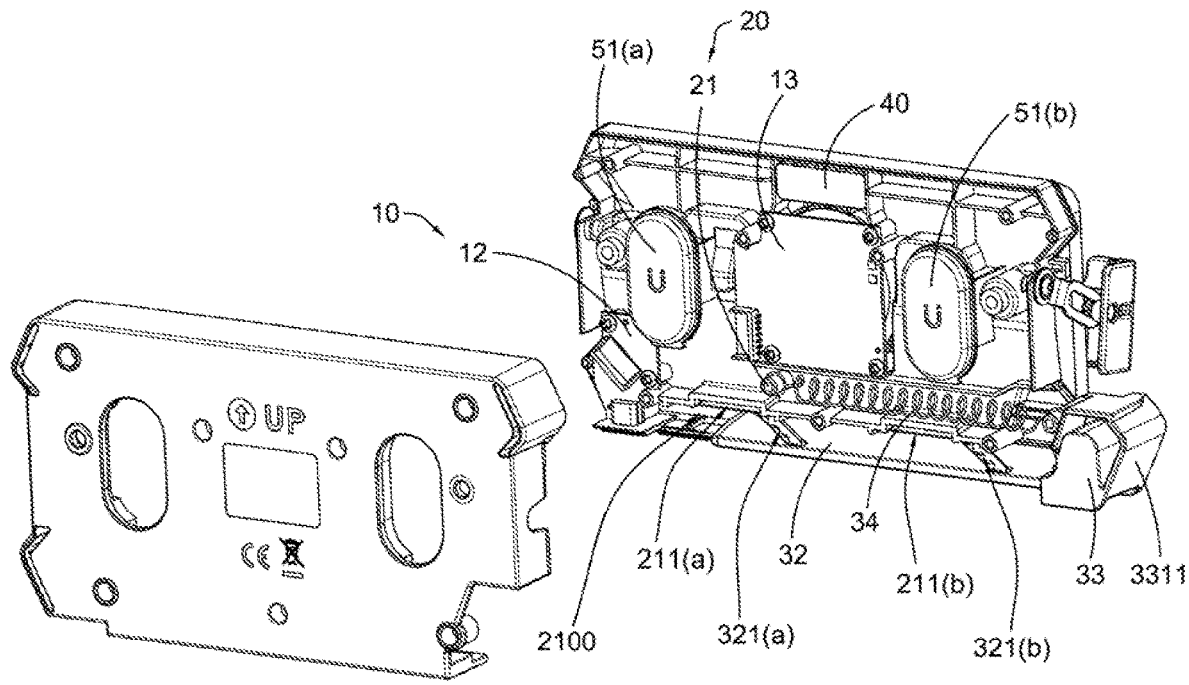
FIG. 7 is another exploded view of the charging station according to the above first preferred embodiment of the present invention.
Figure 8:
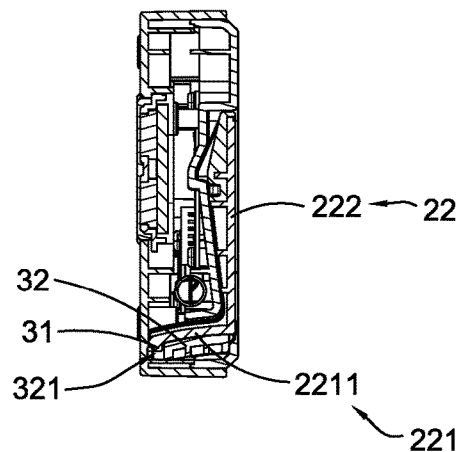
FIG. 8 is a sectional view along line A-A of FIG. 1.

The bearing base 221 comprises at least one base arm 2211. The case body 21 defines at least one extending channel 211, as shown in FIG. 7 and FIG. 9 of the drawings. The base arm 2211 is extended into the extending channel 211 and is able to move in the extending channel 211 along the extending direction of the extending channel 211.

It is worth mentioning that the base arm 2211 curvedly extends from the holding arm 222 to the extending channel 211, so that when the holding member 22 moves far away from the case body 21, the holding member 22 rotates slightly, so that the holding room 200 has a wider opening 2001, so that the second electrical device M2 can be put into the holding room 200 more easily.

Referring to FIG. 2 of the drawings, the case 20 further comprises at least one reinforcing element 23 that connects the case body 21 and the holding member 22. In the outstretching state of the charging station, the reinforcing element 23 provides a reinforce connection between the case body 21 and the holding member 22, so that the second electrical device M2 is held in the holding room 200 more stably. In addition, in the outstretching state of the charging station, the reinforce connection between the case body 21 and the holding member 22 protects the holding member 22, so as to prevent the holding member 22 from being damaged by long-term oppression from the second electrical device.

Referring to FIG. 5 of the drawings, the reinforcing element 23 defines a rotating hole 231 and a sliding slot 232. The holding member 22 further comprises a first connecting element 24 and a second connecting element 25. The first connecting element 24 passes through the rotating hole 231 and connects the reinforcing element 23 to the case body 21 at a first connection position, so that the reinforcing element 23 is able to rotate in respect to the first connection position. The second connecting element 25 passes through the sliding slot 232 and connects the reinforcing element 23 to the holding member 22. The second connecting element 25 is fixed to a second connection position and is able to slide along the sliding slot 232. When the charging station switches between the retracting station and the outstretching station, the second connecting element 25 slides along the sliding slot 232.

According to this first preferred embodiment of the present invention, the bearing base 221 comprises a first base arm 2211a and a second base arm 2211b. Accordingly, the case body 21 defines a first extending channel 211a and a second extending channel 211b. The first base arm 2211a is extended into the first extending channel 211a and is able to move along the first extending channel 211a. The second base arm 2211b is extended into the second extending channel 211b and is able to move along the second extending channel 211b.

Specifically, in the outstretching state of the charging station, the first base arm 2211a is partially kept in the first extending channel 211a. In the process of the charging state being adjusted from the outstretching state to the retracting state, the first base arm 2211a gradually enters the first extending channel 211a. In the retracting state of the charging station, the first base arm 2211a is completely received into the first extending channel 211a. Similarly, in the outstretching state of the charging station, the second base arm 2211b is partially kept in the second extending channel 211b. In the process of the charging state being adjusted from the outstretching state to the retracting state, the second base arm 2211b gradually enters the second extending channel 211b. In the retracting state of the charging station, the second base arm 2211b is completely received into the second extending channel 211b.

Referring to FIG. 2 of the drawings, according to this first preferred embodiment of the present invention, the case 20 comprises a first reinforcing element 23a that connects the case body 21 and the holding member 22 and a second reinforcing element 23b that connects the case body 21 and the holding member 22. In the outstretching state of the charging station, the first reinforcing element 23a provides a reinforce connection between the case body 21 and the holding member 22, and the second reinforcing element 23b provides a reinforce connection between the case body 21 and the holding member 22.

As can be shown in FIG. 4 to FIG. 7, the case 20 further comprises a driving member 30. The driving member 30 drives the base arm 2211 moving back and forth in the extending channel 211, and further drives the retracting and outstretching of the holding member 22, so that the charging station can switch between the retracting state and the outstretching state.

The driving member 30 comprises at least one positioning element 31 and a guiding member 32. According to this first preferred embodiment of the present invention, the positioning element 31 is integrally protruded from the base arm 2211 of the holding member 22. When the guiding member 32 moves in a first direction, the positioning element 31 is driven to move in a second direction, and the holding member 22 integrally connecting with the positioning element 31 is driven to retract or outstretch.

It is worth mentioning that, due to the base arm 2211 is curvedly extends from the holding arm 222 to the extending channel 211, the second direction is a curved direction.

As shown in FIG. 4 to FIG. 11, the guiding member 32 comprises at least one limiting slot 321 extending obliquely. The positioning element 31 is installed into the limiting slot 321. When the guiding member 32 is driven to move, the positioning element 31 moves in the limiting slot 321. The limiting slot 321 has a first slot end 3211 and a second slot end 3212. The positioning element 31 is able to be driven to move between the first slot end 3211 and the second slot end 3212. As can be shown in FIG. 10 and FIG. 11, when the positioning element 31 reaches to the first slot end 3211, the holding member 22 is retracted to the case body 21. When the first positioning element 31 reaches to the second slot end 3212, the holding member 22 is outstretched from the case body 21.

In more detail, the case body 21 defines at least one through groove 210. The base arm 2211 pass through the through groove 210 and connect with the guiding member 32 in such a manner that the positioning element 31 integrally protruding from the base arm 2211 being stuck in the slot body 321.

According to this first preferred embodiment of the present invention, the guiding member 32 comprises a first limiting slot 321a and a second limiting slot 321b. The driving member 30 comprises a first positioning element 31a and a second positioning element 31b. The first positioning element 31a is integrally protruded from the first base arm 2211a of the holding member 22. When the guiding member 32 moves along a first direction, the first positioning element 31a is driven to move in the second direction perpendicular to the first direction, and the holding member 22 integrally connecting with the first positioning element 31a is driven to retract or outstretch.

The first positioning element 31a is installed into the first limiting slot 321a. When the guiding member 32 is driven to move, the first positioning element 31a moves in the first limiting slot 321a. The first limiting slot 321a has a first slot end 3211a and a second slot end 3212a. The first positioning element 31a is able to be driven to move between the first slot end 3211a and the second slot end 3212a. When the first positioning element 31a reaches to the first slot end 3211a, the holding member 22 is retracted to the case body 21. When the first positioning element 31a reaches to the second slot end 3212a, the holding member 22 is outstretched from the case body 21. The second positioning element 31b is installed into the second limiting slot 321b. When the guiding member 32 is driven to move, the second positioning element 31b moves along the second limiting slot 321b. The second limiting slot 321b has a first slot end 3211b and a second slot end 3212b. The second positioning element 31b is able to be driven to move between the first slot end 3211b and the second slot end 3212b. When the second positioning element 31b reaches to the first slot end 3211b, the holding member 22 is retracted to the case body 21. When the second positioning element 31b reaches to the second slot end 3212b, the holding member 22 is outstretched from the case body 21.

The case body 21 defines a first through groove 210a and a second through groove 210b. The first base arm 2211a passes through the first through groove 210a and connects with the guiding member 32 in such a manner that the first positioning element 31a integrally protruding from the first base arm 2211a being stuck in the first slot body 321a. The second base arm 2211b passes through the second through groove 210b and connects with the guiding member 32 in such a manner that the second positioning element 31b integrally protruding from the second base arm 2211b being stuck in the second slot body 321b.

The driving member 30 further comprises operating portion 33 for driving the guiding member 32 to move in the first direction.

According to this first preferred embodiment of the present invention, the operating portion 33 comprise an operating element 331 integrally connected with the guiding member 32 to the guiding member 32 is received an external force to drive the guiding member 32 to move in the first direction.

In detail, the operating element 331 has a first bearing surface 3311 and a second bearing surface 3312. When the external force is applied to the first bearing surface 3311, the operating element 331 is pushed to move in the first direction, and the guiding member 32 integrally connected with the operating element 331 is driven to move in the first direction, so that the charging station can be switched from the outstretching state to the retracting state. When the external force is applied to the second bearing surface 3312, the operating element 331 is pulled to move in the opposite direction in the first direction, and the guiding member 32 integrally connected with the operating element 331 is driven to move in the opposite direction in the first direction, so that the charging station can be switched from the retracting state to the outstretching state.

Figure 3:
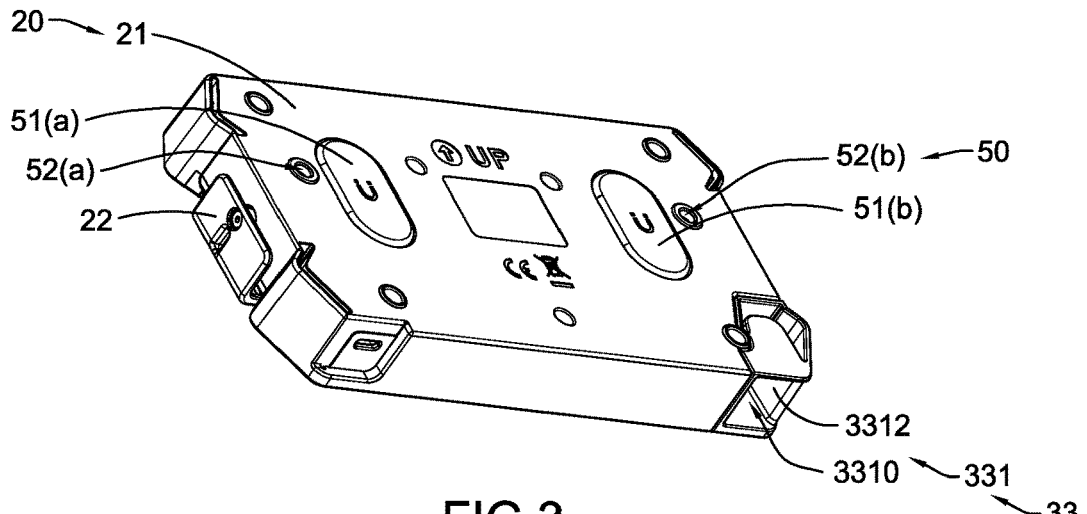
FIG. 3 is another perspective view of the charging station according to the above first preferred embodiment of the present invention.

As shown in FIG. 3 of the present invention, the operating element 331 defines an operation cave 3310, in which a finger of an operator can reach and touch the second bearing surface 3312 to apply an external force to the operating element 331.

The driving member 30 further comprises an elastic element 34 that connects the operating element 331 and the case body 21. According to this first preferred embodiment of the present invention, the elastic element is embodied as a spring.

In a relaxed state of the elastic element 34, the charging station is kept in the retracting state. When an external force is applied to the second bearing surface 3312 of the operating element 331, the external force resists a restoring force of the elastic element 34 and drives the guiding member 32 to remove in the opposite direction in the first direction, and the first positioning element 31a is driven by the guiding member 32

In detail, the case body 21 defines an extending space 2100. The guiding member 32 is extended into the extending space 2100. In the relaxed state of the elastic element 34, the guiding member 32 is kept to a predetermined position in the extending space, so that the first limiting slot 321a and the second limiting slot 321b are respectively kept to corresponding positions, and the first positioning element 31a and the second positioning element 31b are respectively positioned to corresponding positions that makes the holding member 22 being retracted to the case body 21.

When a pulling force is applied to the second bearing surface 3312 of the operating element 331 of the operating portion 33, the guiding member 32 is driven to move in the positive direction of the first direction. The first limiting slot 321a drives the first positioning element 31a to move in the first limiting slot 321a, and the holding member 22 integrally connecting with the first positioning element 31a is driven to move away from the case body 21, so that the charging station is switched to the outstretching state.

According to this first preferred embodiment of the present invention, the second limiting slot 321b has a same shape with the first limiting slot 321a and the extending direction of the second limiting slot 321b is parallel to the extending direction of the first limiting slot 321a. When the pulling force is applied to the second bearing surface 3312 of the operating element 331 of the operating portion 33, and the guiding member 32 is driven to move in the positive direction of the first direction. The second limiting slot 321b drives the second positioning element 31b to move in the second limiting slot 321b, and the holding member 22 integrally connecting with the first positioning element 31a and the second positioning element 31b is driven to move away from the case body 21 under the combined effect of the first positioning element 31a and the second positioning element 31b, so that the charging station is switched to the outstretching state, and the holding room 200 suitable for holding the second electrical device is formed.

In the outstretching state of the charging station, the elastic element 34 is in a stretched state and has a tendency to recover. After the second electrical device is put into the holding room, the elastic element 34 having the recover tendency provides a pulling force to the operating element 331. Under the linkage of the elastic element 34, the operating portion 33, the guiding member 32, the first positioning element 31a and the second positioning element 31b, the holding member 22 has a tendency to retract to the case body 21, so that the second electrical device can be held to the holding room 200 more firmly.

Figure 10:
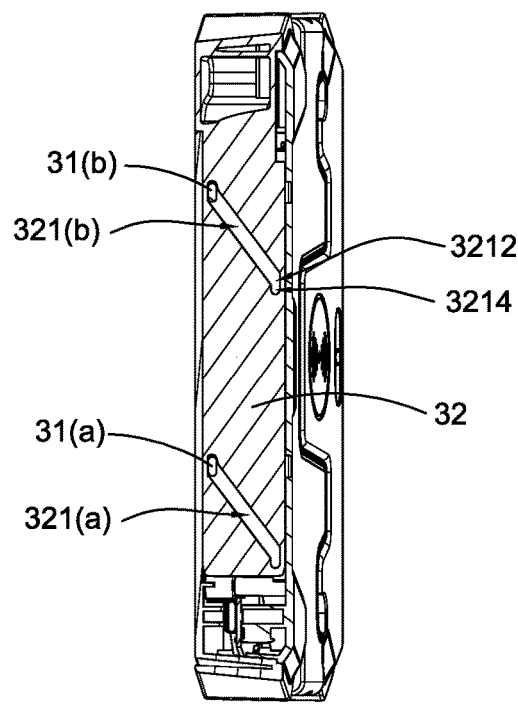
FIG. 10 is a sectional view along line C-C of FIG. 1.
Figure 11:
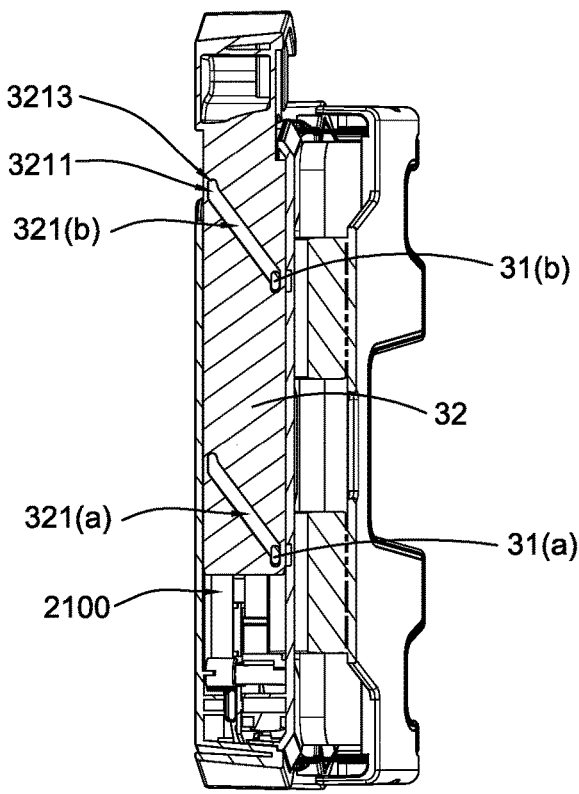
FIG. 11 is a sectional view along line D-D of FIG. 2.

It is worth mentioning that, in the outstretching state of the charging station, the holding member 22 can be held to the outstretching position, so that the second electrical device can be conveniently place into the holding room. Referring to FIG. 10 and FIG. 11 of the drawings, the limiting slot 321 further defines a first extending part 3213 that penetrates to the first slot end 3211 and a second extending part 3214 that penetrates to the second slot end 3212. When the positioning element 31 partially reaches to the extending part 3213, the force from the elastic element 34 alone cannot easily drive the guiding member 32 to move in the opposite direction of the first direction and further drive the holding member 22 to retract to the case body 21. After a pushing force is applied to the first bearing surface 3311, the elastic element 34 pulls the operating portion 33 and the guiding member 32 integrally formed to the operating element to move in the opposite direction of the first direction. If the second electrical device is in the holding room 200, by the driving of the guiding member 32, the holding member 22 moves toward the second electrical device to hold the second electrical device M2 more firmly. If nothing is held in the holding room 200, by the driving of the guiding member 32, the holding member 22 moves toward the case body 21 and retracts to the case body 21 charging surface.

In detail, the case body 21 defines a receiving groove 300. In the retracting state of the charging station, the holding member 22 is received into the receiving groove 300. charging surface The first electrical device M1 is charged in the charging surface 100.

According to this first preferred embodiment of the present invention, the first electrical device M1 is magnetically attach to the charging surface 100. In detail, the charging station form comprises a magnetic unit 40 that provides a magnetic attraction. It is worth mentioning that the first electrical device M1 is magnetic or is able to be attracted by the magnetic unit 40. In other words, the first electrical device M1 comprises a magnetic mating member. In the retracting state of the charging station, under the action of the magnetic unit 40, the first electrical device M1 is attached to the charging surface 100.

Referring to FIG. 4 of the drawings, the power supply member 10 comprises a power sending unit 11. In the retracting state, the first electrical device is attached to the charging surface 100 to obtain power from the power sending unit 11. According to this first preferred embodiment of the present invention, the power sending unit 11 is embodied as a sending coil.

The power supply member 10 further comprises a power getting unit 12 getting power from an external circuit. The power sending unit 11 is electrically connected with the power getting unit 12, so that the power supply member 10 is able to obtain the power from the external circuit and send the power to the electrical device attached to the case 20, such as the first electrical device being attached to the charging surface 100, or the second electrical device being held to the holding room 200.

According to this first preferred embodiment of the present invention, the power supply member 10 further comprises a power storage unit 13 electrically connecting with both the power storage unit 13 and the power sending unit 11. Power got by the power getting unit 12 can be stored to the power storage unit 13. The power sending unit 11 obtains power from the power storage unit 13 and sends power to the electrical device.

It is worth mentioning that, when the power getting unit 12 is electrically disconnected from the external circuit, the power sending unit 11 still can obtains power storage to the power storage unit 13 and sends power to the electrical device.

The charging station further comprises a wall-mounted member 50 coupled to the case body 21, so that the charging station is able to be mounted to a wall W. Referring to FIG. 12 of the drawings, the charging station is side mounted to the wall. In the retracting station of the charging station, the first electrical device M1, such as a work light is attached to the charging surface 100. The work light that is kept to the charging surface 100 and obtains power from the power supply member 10 is able to provide low-level lighting. A user who needs to take the work light to another place to use can take the work light from the charging station and catch the work light to where needed.

Referring to FIG. 13 of the drawings, the charging station is side mounted to the wall. In the outstretching station of the charging station, the second electrical device M2, such as a mobile phone is held to the holding room 200. The mobile phone that is held to the holding room 200 and obtains power from the power supply member 10 is able to be obtained easily. When the user works in a workshop needs to charge the mobile phone, the user can conveniently place the mobile phone into the holding room 200. When the user needs the mobile phone, the user can easily take it away.

Referring to FIG. 3 of the drawings, the wall-mounted member 50 comprises at least one magnetic element 51 fixed to the case body 21, so that the charging station is capable of being magnetically installed to a magnetic wall or an iron wall.

As can be shown in FIG. 3 of the drawings, the wall-mounted member 50 further has at least one hole 52 formed to the case body 21, so as to convenient the charging station to be installed on the wall by punching and fixing.

According to this first preferred embodiment of the present invention, the wall-mounted member 50 comprises a first magnetic element 51*a*, a second magnetic element 51*b*, and has a first hole 52*a* and a second hole 52*b*.

Referring to FIG. 14 to FIG. 26 of the drawings, a charging station according to a second preferred embodiment of the present invention is illustrated. The charging station comprises a power supply member 10 and a case 20A. The power supply member 10 is installed in the case 20A. The case 20A comprises a case body 21A and a holding member 22.

Figure 14:
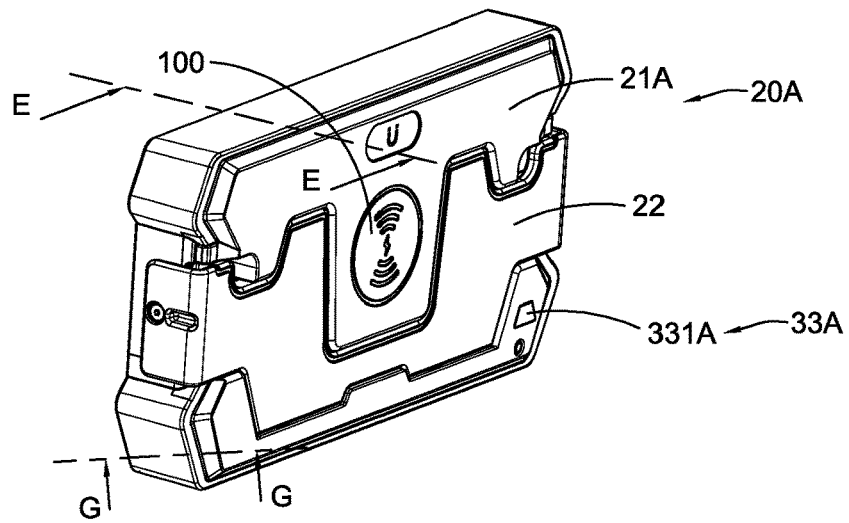
FIG. 14 is a perspective view of a charging station according to a second preferred embodiment of the present invention, illustrating a retracting state of the charging station.
Figure 15:
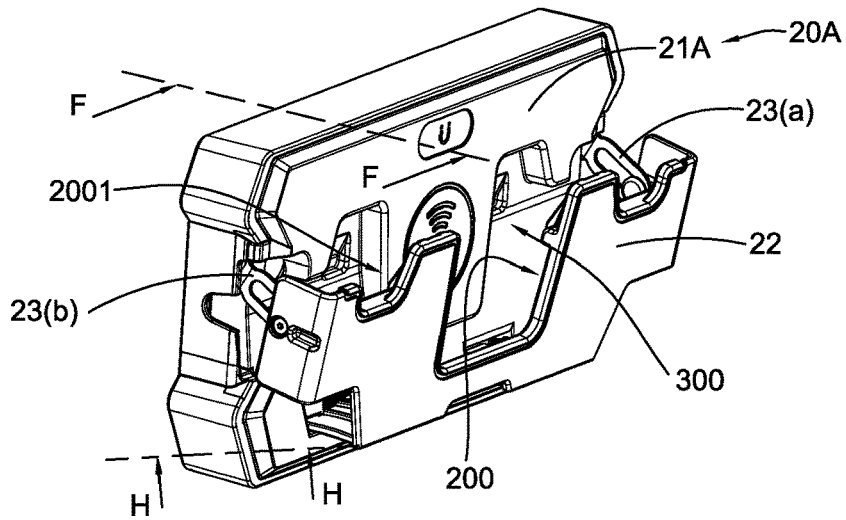
FIG. 15 is another perspective view of the charging station according to the above second preferred embodiment of the present invention, illustrating an outstretching state of the charging station.

The charging case has a retracting state and an outstretching state. In the retracting state, the holding member 22 is retracted to the case body 21A charging surface, as shown in FIG. 14. In the outstretching state, the holding member 22 is outstretched from the case body 21A, so as to form a holding room 200, as shown in FIG. 15.

Figure 25:
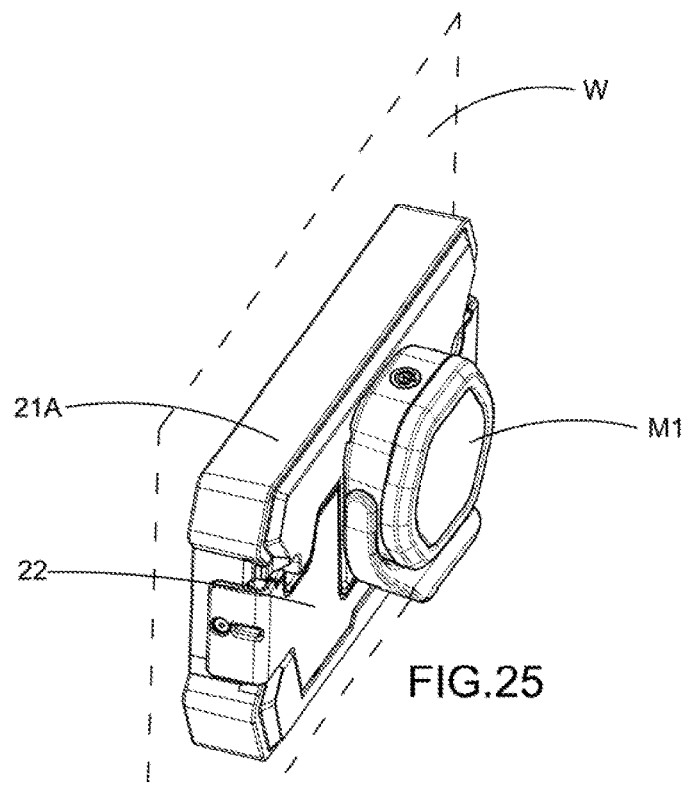
FIG. 25 is a perspective view of the charging station according to the above second preferred embodiment of the present invention, illustrating a first using state of the charging station.
Figure 26:
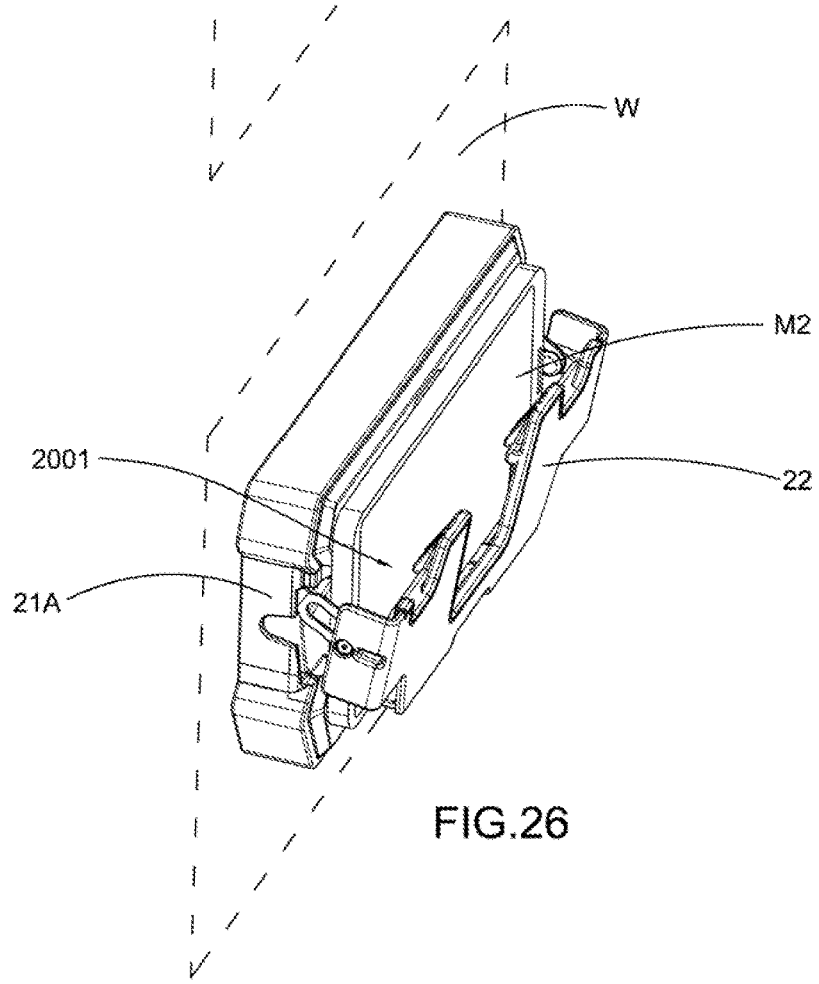
FIG. 26 is a perspective view of the charging station according to the above second preferred embodiment of the present invention, illustrating a second using state of the charging station.

Referring to FIG. 25 of the drawings, in the retracting state, a first electrical device M1 is capable of being kept to the charging surface 100 and obtaining power from the power supply member 10. Referring to FIG. 26 of the drawings, in the outstretching state, a second electrical device M2 is capable of being held into the holding room 200 and obtaining power from the power supply member 10.

Figure 17:
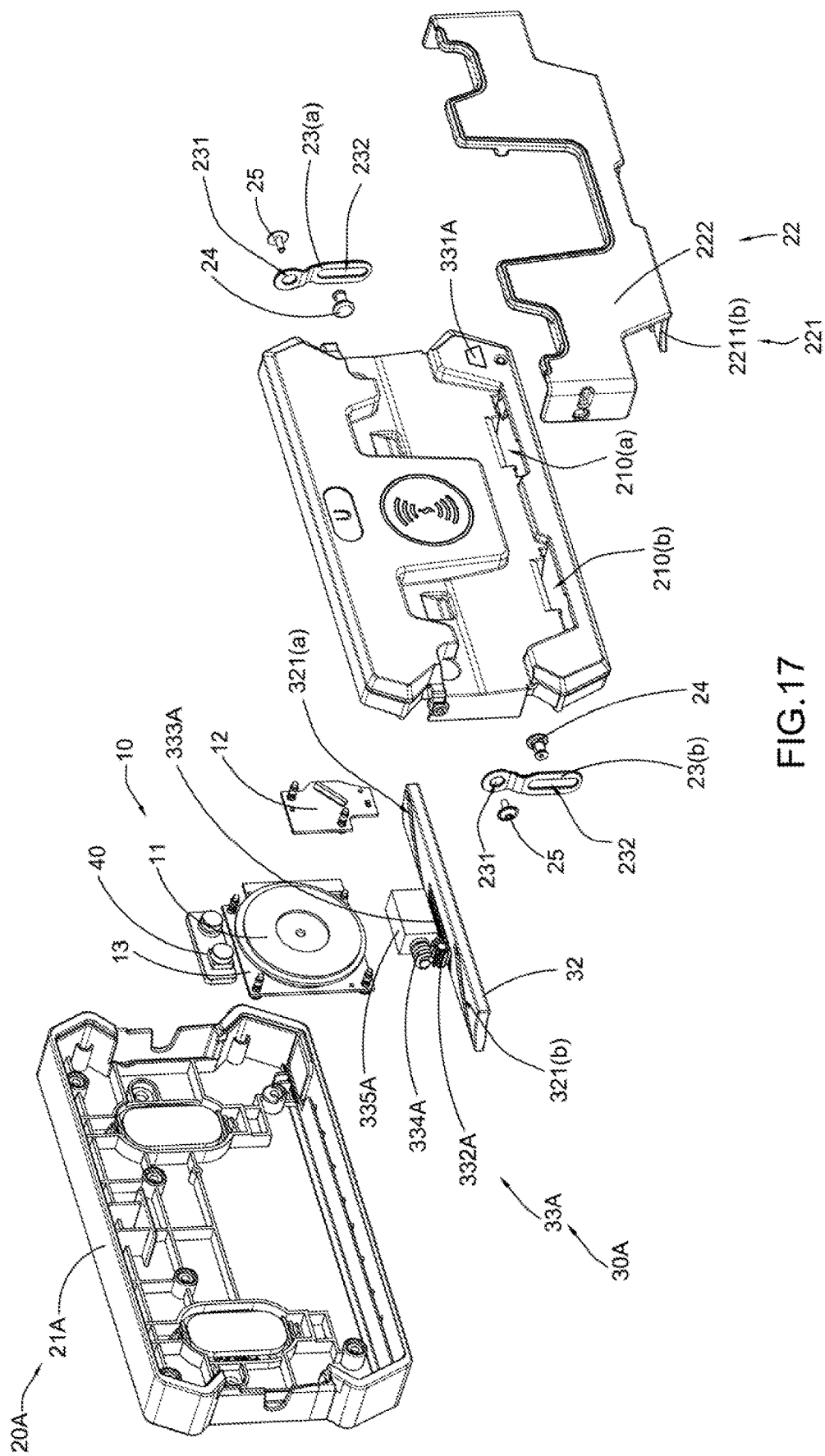
FIG. 17 is an exploded view of the charging station according to the above second preferred embodiment of the present invention.
Figure 18:
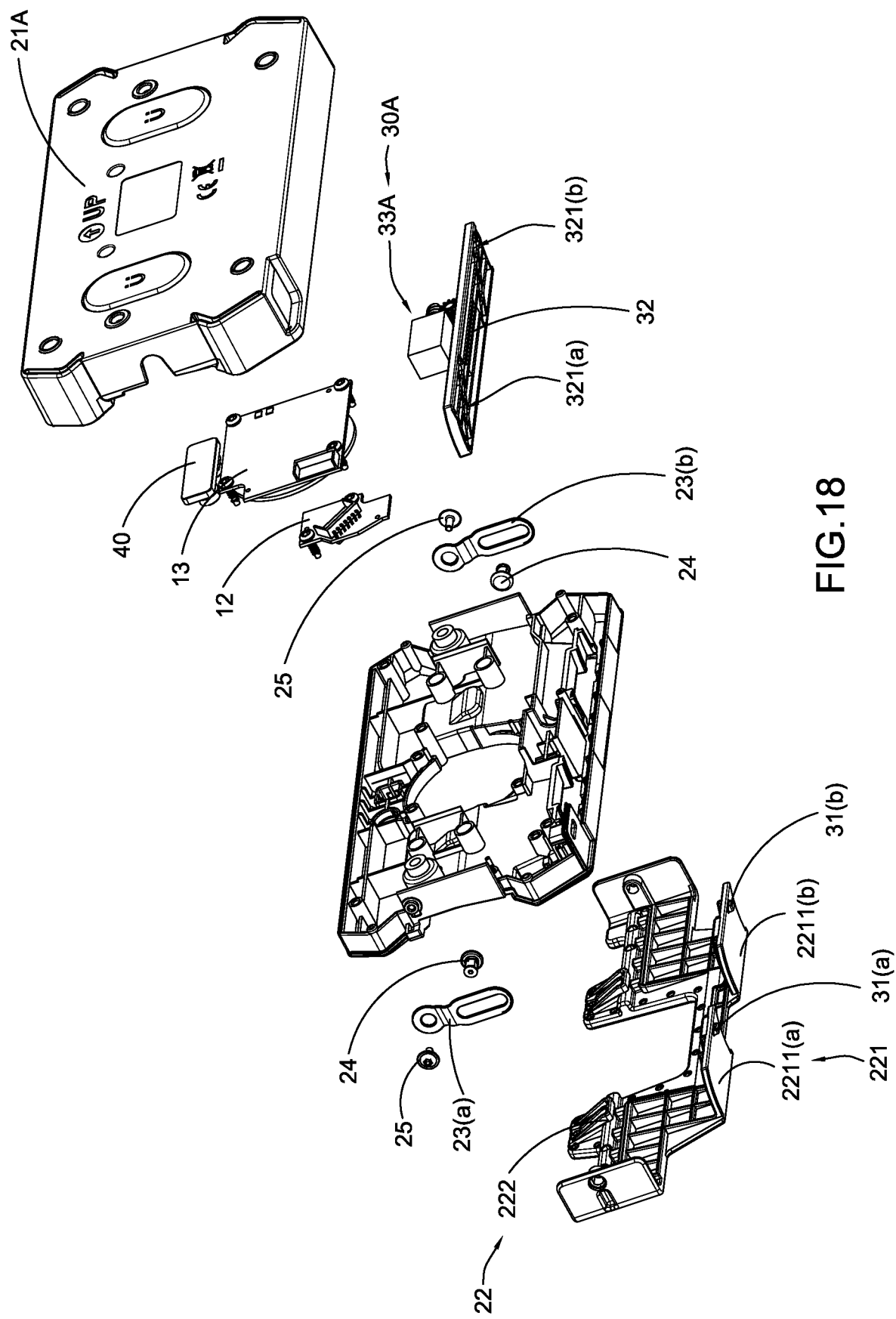
FIG. 18 is another exploded view of the charging station according to the above second preferred embodiment of the present invention.
Figure 22:
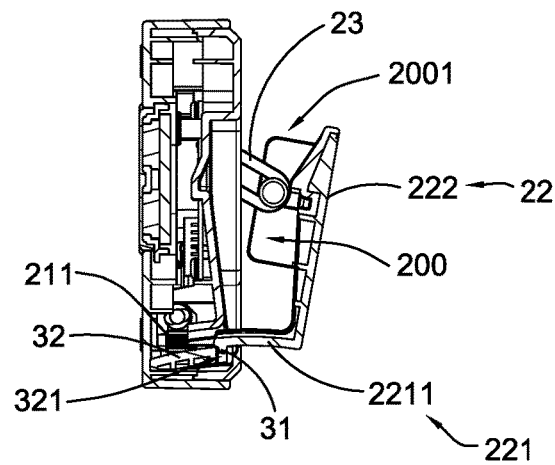
FIG. 22 is a sectional view along line F-F of FIG. 15.
Figure 23:
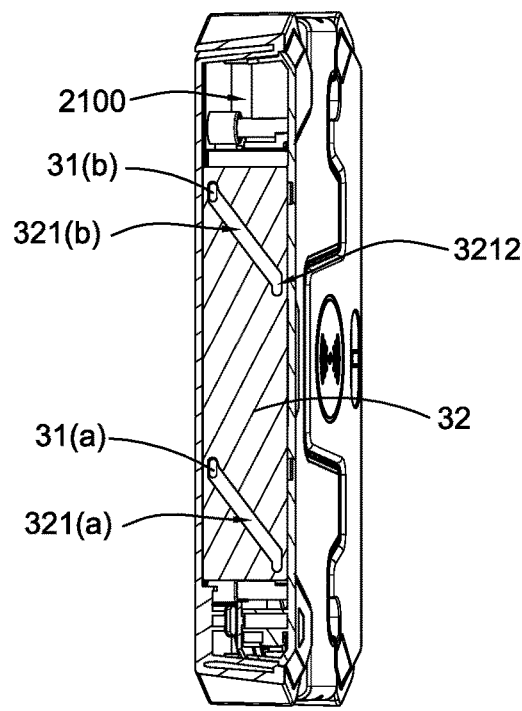
FIG. 23 is a sectional view along line G-G of FIG. 14.
Figure 24:
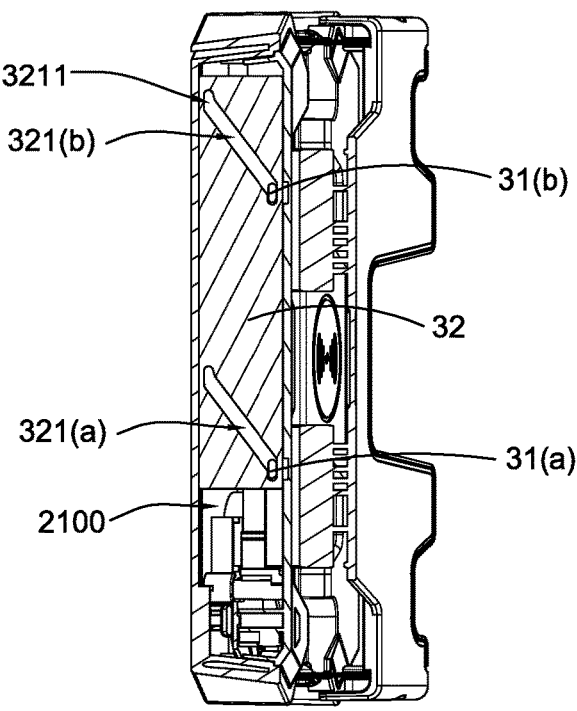
FIG. 24 is a sectional view along line H-H of FIG. 15.

As shown in FIG. 17 and FIG. 18 of the drawings, the holding member 22 comprises a bearing base 221 and a holding arm 222 integrally connected to the bearing base 221. Referring to FIG. 22 and FIG. 26 of the drawings, in the outstretching state of the charging station, the second electrical device M2 is borne to the bearing base 221 and held by the holding arm 222, so that the second electrical device M2 is firmly held to the holding room 200.

Figure 20:
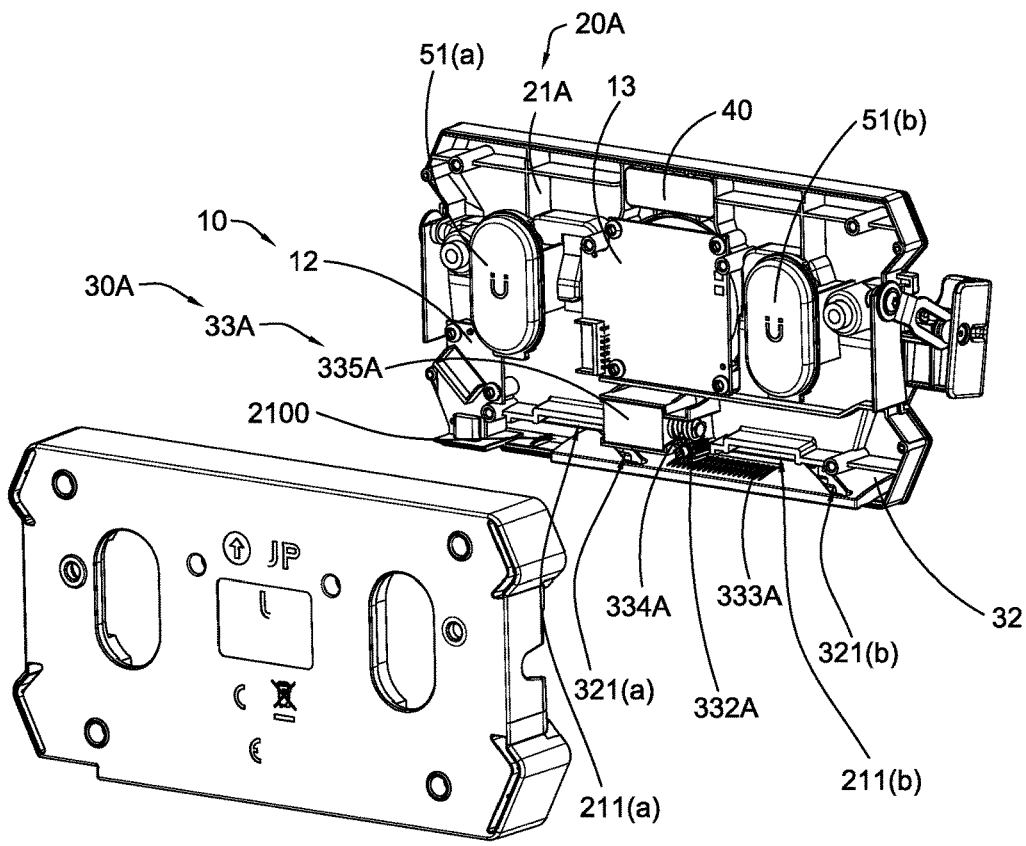
FIG. 20 is another exploded view of the charging station according to the above second preferred embodiment of the present invention.
Figure 21:
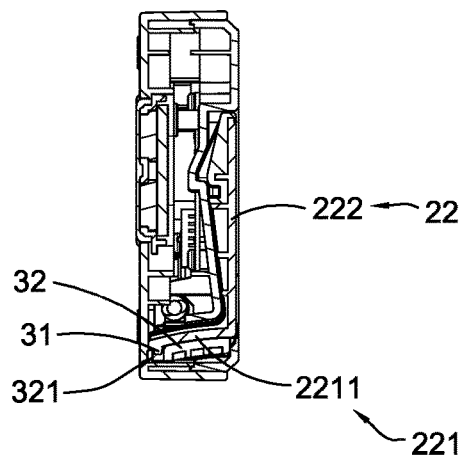
FIG. 21 is a sectional view along line E-E of FIG. 14.

The bearing base 221 comprises at least one base arm 2211. The case body 21A defines at least one extending channel 211, as shown in FIG. 20 and FIG. 22 of the drawings. The base arm 2211 is extended into the extending channel 211 and is able to move in the extending channel 211 along the extending direction of the extending channel 211.

It is worth mentioning that the base arm 2211 curvedly extends from the holding arm 222 to the extending channel 211, so that when the holding member 22 moves far away from the case body 21A, the holding member 22 rotates slightly, so that the holding room 200 has a wider opening 2001, so that the second electrical device M2 can be put into the holding room 200 more easily.

Referring to FIG. 15 of the drawings, the case 20A further comprises at least one reinforcing element 23 that connects the case body 21A and the holding member 22. In the outstretching state of the charging station, the reinforcing element 23 provides a reinforce connection between the case body 21A and the holding member 22, so that the second electrical device M2 is held in the holding room 200 more stably. In addition, in the outstretching state of the charging station, the reinforce connection between the case body 21A and the holding member 22 protects the holding member 22, so as to prevent the holding member 22 from being damaged by long-term oppression from the second electrical device.

Referring to FIG. 18 of the drawings, the reinforcing element 23 defines a rotating hole 231 and a sliding slot 232.

The holding member 22 further comprises a first connecting element 24 and a second connecting element 25. The first connecting element 24 passes through the rotating hole 231 and connects the reinforcing element 23 to the case body 21A at a first connection position, so that the reinforcing element 23 is able to rotate in respect to the first connection position. The second connecting element 25 passes through the sliding slot 232 and connects the reinforcing element 23 to the holding member 22. The second connecting element 25 is fixed to a second connection position and is able to slide along the sliding slot 232. When the charging station switches between the retracting station and the outstretching station, the second connecting element 25 slides along the sliding slot 232.

According to this second preferred embodiment of the present invention, the bearing base 221 comprises a first base arm 2211*a* and a second base arm 2211*b*. Accordingly, the case body 21A defines a first extending channel 211*a* and a second extending channel 211*b*. The first base arm 2211*a* is extended into the first extending channel 211*a* and is able to move along the first extending channel 211*a*. The second base arm 2211*b* is extended into the second extending channel 211*b* and is able to move along the second extending channel 211*b*.

Specifically, in the outstretching state of the charging station, the first base arm 2211*a* is partially kept in the first extending channel 211*a*. In the process of the charging state being adjusted from the outstretching state to the retracting state, the first base arm 2211*a* gradually enters the first extending channel 211*a*. In the retracting state of the charging station, the first base arm 2211*a* is completely received into the first extending channel 211*a*. Similarly, in the outstretching state of the charging station, the second base arm 2211*b* is partially kept in the second extending channel 211*b*. In the process of the charging state being adjusted from the outstretching state to the retracting state, the second base arm 2211*b* gradually enters the second extending channel 211*b*. In the retracting state of the charging station, the second base arm 2211*b* is completely received into the second extending channel 211*b*.

Referring to FIG. 15 of the drawings, according to this second preferred embodiment of the present invention, the case 20A comprises a first reinforcing element 23*a* that connects the case body 21A and the holding member 22 and a second reinforcing element 23*b* that connects the case body 21A and the holding member 22. In the outstretching state of the charging station, the first reinforcing element 23*a* provides a reinforce connection between the case body 21A and the holding member 22, and the second reinforcing element 23*b* provides a reinforce connection between the case body 21A and the holding member 22.

As can be shown in FIG. 17 to FIG. 20, the case 20A further comprises a driving member 30A, so as to drive the base arm 2211 moving back and forth in the extending channel 211, and further drive the retracting and outstretching of the holding member 22, and further the charging station can switch between the retracting state and the outstretching state.

The driving member 30A comprises at least one positioning element 31 and a guiding member 32. According to this second preferred embodiment of the present invention, the positioning element 31 is integrally protruded from the base arm 2211 of the holding member 22. When the guiding member 32 moves in a first direction, the positioning element 31 is driven to move in a second direction perpendicular to the first direction, and the holding member 22 integrally connecting with the positioning element 31 is driven to retract or outstretch.

It is worth mentioning that, due to the base arm 2211 is curvedly extends from the holding arm 222 to the extending channel 211, the second direction is a curved direction.

As shown in FIG. 17 to FIG. 24, the guiding member 32 comprises at least one limiting slot 321. The positioning element 31 is installed into the limiting slot 321. When the guiding member 32 is driven to move, the positioning element 31 moves in the limiting slot 321. The limiting slot 321 has a first slot end 3211 and a second slot end 3212. The positioning element 31 is able to be driven to move between the first slot end 3211 and the second slot end 3212. As can be shown in FIG. 23 and FIG. 24, when the positioning element 31 reaches to the first slot end 3211, the holding member 22 is retracted to the case body 21A. When the first positioning element 31 reaches to the second slot end 3212, the holding member 22 is outstretched from the case body 21A.

In more detail, the case body 21A defines at least one through groove 210. The base arm 2211 pass through the through groove 210 and connect with the guiding member 32 in such a manner that the positioning element 31 integrally protruding from the base arm 2211 being stuck in the slot body 321.

According to this second preferred embodiment of the present invention, the guiding member 32 comprises a limiting slotfirst limiting slot 321a and a limiting slotsecond limiting slot 321b. The driving member 30A comprises a first positioning element 31a and a second positioning element 31b. The first positioning element 31a is integrally protruded from the first base arm 2211a of the holding member 22. When the guiding member 32 moves along a first direction, the first positioning element 31a is driven to move in the second direction perpendicular to the first direction, and the holding member 22 integrally connecting with the first positioning element 31a is driven to retract or outstretch.

The first positioning element 31a is installed into the limiting slotfirst limiting slot 321a. When the guiding member 32 is driven to move, the first positioning element 31a moves in the limiting slotfirst limiting slot 321a. The limiting slotfirst limiting slot 321a has a first slot end 3211a and a second slot end 3212a. The first positioning element 31a is able to be driven to move between the first slot end 3211a and the second slot end 3212a. When the first positioning element 31a reaches to the first slot end 3211a, the holding member 22 is retracted to the case body 21A. When the first positioning element 31a reaches to the second slot end 3212a, the holding member 22 is outstretched from the case body 21A.The second positioning element 31b is installed into the limiting slotsecond limiting slot 321b. When the guiding member 32 is driven to move, the second positioning element 31b moves along the limiting slotsecond limiting slot 321b. The limiting slotsecond limiting slot 321b has a first slot end 3211b and a second slot end 3212b. The second positioning element 31b is able to be driven to move between the first slot end 3211b and the second slot end 3212b. When the second positioning element 31b reaches to the first slot end 3211b, the holding member 22 is retracted to the case body 21A. When the second positioning element 31b reaches to the second slot end 3212b, the holding member 22 is outstretched from the case body 21A.

The case body 21A defines a first through groove 210a and a second through groove 210b. The first base arm 2211a pass through the first through groove 210a and connect with the guiding member 32 in such a manner that the first positioning element 31a integrally protruding from the first base arm 2211a being stuck in the first slot body 321a. The second base arm 2211b pass through the second through groove 210b and connect with the guiding member 32 in such a manner that the second positioning element 31b integrally protruding from the second base arm 2211b being stuck in the second slot body 321b.

The driving member 30A further comprises operating portion 33A. The driving member 30A drives the guiding member 32 to move in the positive and opposite direction of the first direction.

Figure 19:
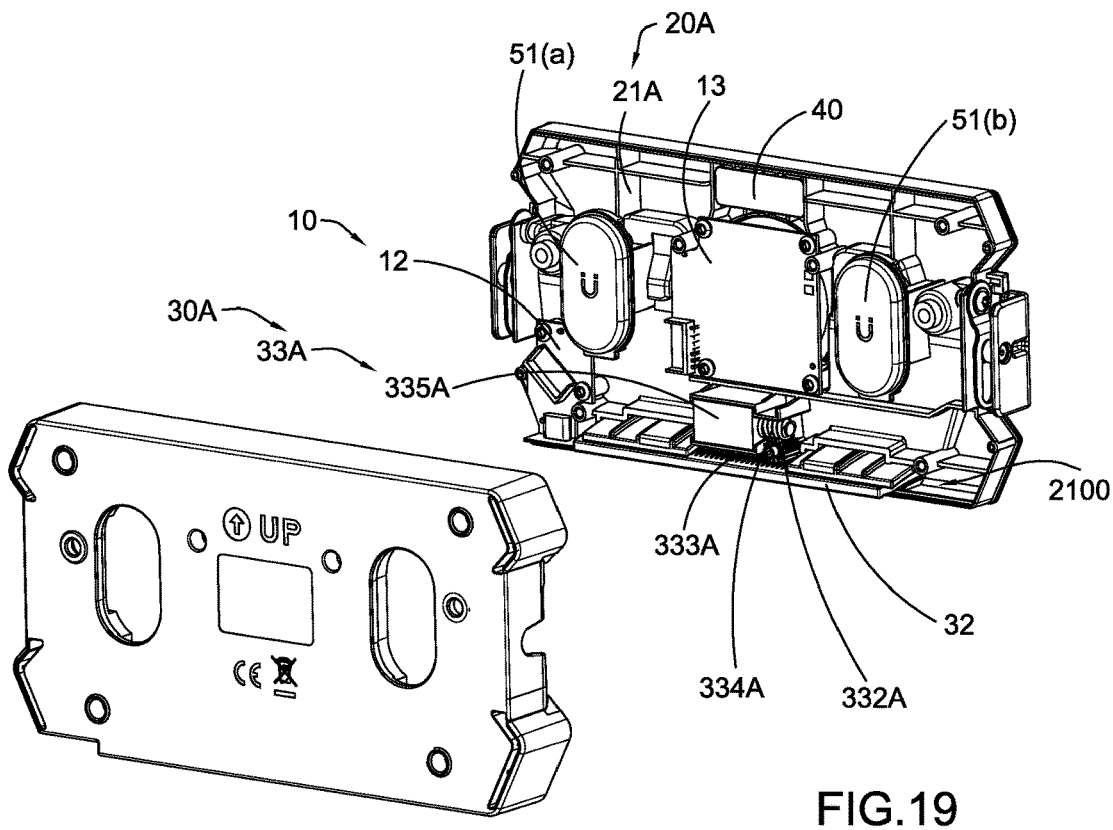
FIG. 19 is another exploded view of the charging station according to the above second preferred embodiment of the present invention.

According to this second preferred embodiment of the present invention, the driving member 30A comprise a gear 332A and a toothed bar structure 333A integrally formed to the guiding member 32. Referring to FIG. 19, when the gear 332A is driven to rotate in a first counterclockwise direction, the toothed bar structure 333A is driven to move in a positive direction of a first direction. The guiding member 32 integrally formed with the toothed bar structure 333A is driven to move in the positive direction of the first direction. Referring to FIG. 20, when the gear 332A is driven to rotate in a first clockwise direction, the toothed bar structure 333A is driven to move in an opposite direction of the first direction. The guiding member 32 integrally formed with the toothed bar structure 333A is driven to move in the opposite direction of the first direction. Hence, the charging station can be switched between the outstretching state and the retracting state.

In detail, the gear 332A meshes with the toothed bar structure 333A integrally formed to the guiding member 32. When the gear 332A is driven to rotate, the guiding member 32 is driven to move.

The driving member 30A further comprises a screw 334A that meshes to the gear 333A. When the screw 334A is driven to rotate around a first axis L1, the gear 332A is driven to rotate around a second axis L2 perpendicular to the first axis L1, and further drives the guiding member 32 to move.

Furthermore, the driving member 30A further comprises a motor 335A that drive the screw 334A to rotate the first axis L1. Referring to FIG. 19, when the motor 335A drives the screw 334A to rotate in a second counterclockwise direction around a first axis L1. The screw 334A drives the gear 332A to rotate in the first counterclockwise direction around the second axis L2, and the toothed bar structure 333A is driven to move in a positive direction of a first direction. The guiding member 32 integrally formed with the toothed bar structure 333A is driven to move in the positive direction of the first direction. Referring to FIG. 20, when the motor 335A drives the screw 334A to rotate in a second clockwise direction around the first axis L1. The screw 334A drives the gear 332A to rotate in the first clockwise direction around the second axis L2, and the toothed bar structure 333A is driven to move in an opposite direction of the first direction. The guiding member 32 integrally formed with the toothed bar structure 333A is driven to move in the opposite direction of the first direction. Hence, the charging station can be switched between the outstretching state and the retracting state.

As can be shown in FIG. 14 and FIG. 17, the driving member 30A further comprises an operating element 331 A, so as to facilitate the motor 334A to receive an operation signal, and then control the start and stop of the motor 334A.

Referring to FIG. 17 of the drawings, the case body 21A defines an extending space 2100. The guiding member 32 is extended into the extending space 2100. Referring to FIG. 19 of the drawings, in the retracting state of the charging station, the guiding member 32 is kept to a first predetermined position in the extending space 2100, so that the first limiting slot 321a and the second limiting slot 321b are respectively kept to corresponding positions, and the first positioning element 31a and the second positioning element 31b are respectively positioned to corresponding positions that makes the holding member 22 being retracted to the case body 21A.

When the operating element 331A is operated, the motor drives the screw 334A to rotate in the second counterclockwise direction around the first axis L1. The screw 334A drives the gear 332A to rotate in the first counterclockwise direction around the second axis L2, and the toothed bar structure 333A is driven to move in a positive direction of a first direction. The guiding member 32 integrally formed with the toothed bar structure 333A is driven to move to a second predetermined position in the positive direction of the first direction. The first limiting slot 321a drives the first positioning element 31a to move in the first limiting slot 321a, and the holding member 22 integrally connecting with the first positioning element 31a is driven to move away from the case body 21A, so that the charging station is switched to the outstretching state.

Referring to FIG. 20 of the drawings, in the outstretching state of the charging station, the guiding member 32 is kept to the second predetermined position in the extending space2100, so that the first limiting slot 321a and the second limiting slot 321b are respectively kept to corresponding positions, and the first positioning element 31a and the second positioning element 31b are respectively positioned to corresponding positions that makes the holding member 22 being outstretching from the case body 21A.

When the operating element 331A is operated, the motor drives the screw 334A to rotate in the second clockwise direction around the first axis L1. The screw 334A drives the gear 332A to rotate in the first clockwise direction around the second axis L2, and the toothed bar structure 333A is driven to move in an opposite direction of the first direction. The guiding member 32 integrally formed with the toothed bar structure 333A is driven to move in the opposite direction of the first direction. The first limiting slot 321a drives the first positioning element 31a to move in the first limiting slot 321a, and the holding member 22 integrally connecting with the first positioning element 31a is driven to move to the case body 21A, so that the charging station is switched to the retracting state.

According to this second preferred embodiment of the present invention, the second limiting slot 321b has a same shape with the first limiting slot 321a and the extending direction of the second limiting slot 321b is parallel to the extending direction of the first limiting slot 321a. When the guiding member 32 is driven to move in the positive direction of the first direction. The second limiting slot 321b drives the second positioning element 31b to move in the second limiting slot 321b, and the holding member 22 integrally connecting with the first positioning element 31a and the second positioning element 31b is driven to move away from the case body 21A under the combined effect of the first positioning element 31a and the second positioning element 31b, so that the charging station is switched to the outstretching state, and the holding room 200 suitable for holding the second electrical device is formed.

As can be shown in FIG. 15, the case body 21A defines a receiving groove 300. In the retracting state of the charging station, the holding member 22 is received into the receiving groove 300, so as to form the charging surface 100 for keeping the first electrical device M1.

According to this second preferred embodiment of the present invention, the first electrical device M1 is magnetically kept to the charging surface 100. In detail, the charging station form comprises a magnetic unit 40 that provides a magnetic attraction. It is worth mentioning that the first electrical device M1 is magnetic or is able to be attracted by the magnetic unit 40. In other words, the first electrical device M1 comprises a magnetic mating member. In the retracting state of the charging station, under the action of the magnetic unit 40, the first electrical device M1 is kept to the charging surface 100.

Referring to FIG. 17 of the drawings, the power supply member 10 comprises a power sending unit 11. In the retracting state, the first electrical device kept to the charging surface 100 is able to obtain power from the power sending unit 11. According to this second preferred embodiment of the present invention, the power sending unit 11 is embodied as a sending coil.

The power supply member 10 further comprises a power getting unit 12 getting power from an external circuit. The power sending unit 11 is electrically connected with the power getting unit 12, so that the power supply member 10 is able to obtain the power from the external circuit and send the power to the electrical device kept to the case 20A, such as the first electrical device being kept to the charging surface 100, or the second electrical device being held to the holding room 200.

According to this second preferred embodiment of the present invention, the power supply member 10 further comprises a power storage unit 13 electrically connecting with both the power storage unit 13 and the power sending unit 11. Power got by the power getting unit 12 can be stored to the power storage unit 13. The power sending unit 11 obtains power from the power storage unit 13 and sends power to the electrical device.

It is worth mentioning that, when the power getting unit 12 is electrically disconnected from the external circuit, the power sending unit 11 still can obtains power storage to the power storage unit 13 and sends power to the electrical device.

The charging station further comprises a wall-mounted member 50 coupled to the case body 21A, so that the charging station is able to be mounted to a wall W. Referring to FIG. 25 of the drawings, the charging station is side mounted to the wall. In the retracting station of the charging station, the first electrical device M1, such as a work light is kept to the charging surface 100. The work light that is kept to the charging surface 100 and obtains power from the power supply member 10 is able to provide low-level lighting. A user who needs to take the work light to another place to use can take the work light from the charging station and catch the work light to where needed.

Referring to FIG. 26 of the drawings, the charging station is side mounted to the wall. In the outstretching station of the charging station, the second electrical device M2, such as a mobile phone is held to the holding room 200. The mobile phone that is held to the holding room 200 and obtains power from the power supply member 10 is able to be obtained easily. When he/she working in a workshop needs to charge his/her mobile phone, he/she can conveniently place his/her mobile phone into the holding room 200. When he/she needs the mobile phone, he/she can easily take it away.

Figure 16:
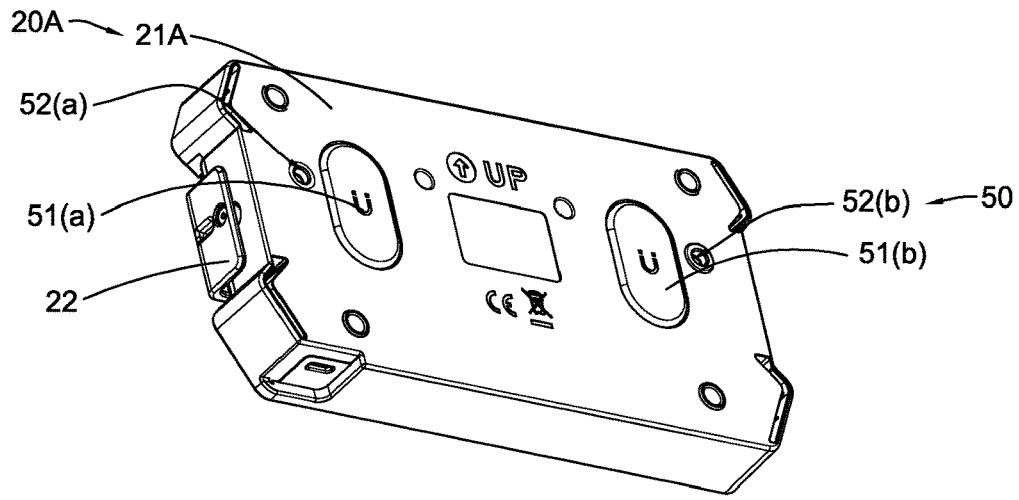
FIG. 16 is another perspective view of the charging station according to the above second preferred embodiment of the present invention.

Referring to FIG. 16 of the drawings, the wall-mounted member 50 comprises at least one magnetic element 51 fixed to the case body 21A, so that the charging station is capable of being magnetically installed to a magnetic wall or an iron wall.

As can be shown in FIG. 16 of the drawings, the wall-mounted member 50 further comprises at least one hole 52 formed to the case body 21A, so as to convenient the charging station to be installed on the wall by punching and fixing.

According to this second preferred embodiment of the present invention, the wall-mounted member 50 comprises a first magnetic element 51a, a second magnetic element 51b, a first hole 52a and a second hole 52b.

Referring to FIG. 27 to FIG. 39 of the drawings, a charging station according to a third preferred embodiment of the present invention is illustrated. The charging station comprises at least one power supply member 10B and a case 20B. The power supply member 10B is installed to the case 20B. The case 20B comprises a case body 21B and a holding member 22.

Figure 27:
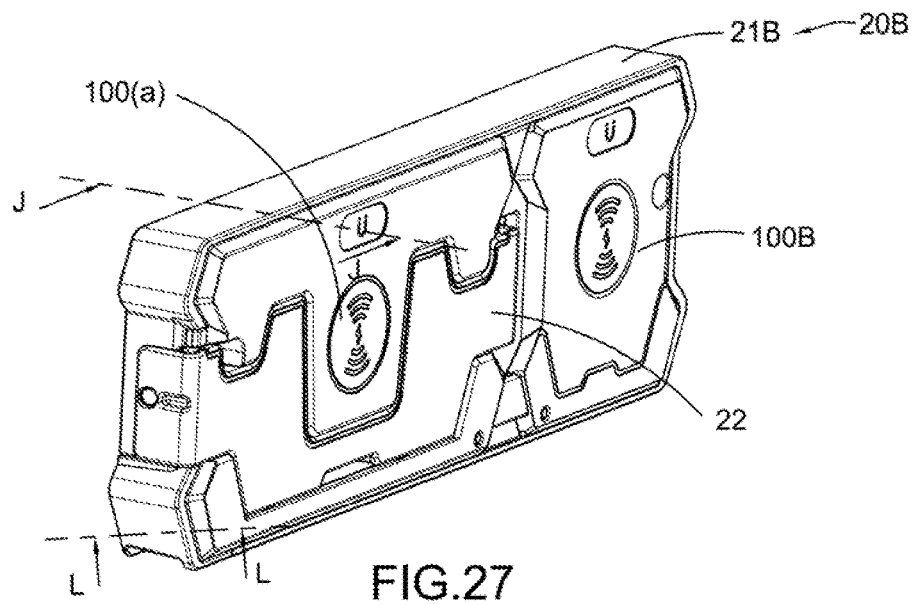
FIG. 27 is a perspective view of a charging station according to a third preferred embodiment of the present invention, illustrating a retracting state of the charging station.
Figure 28:
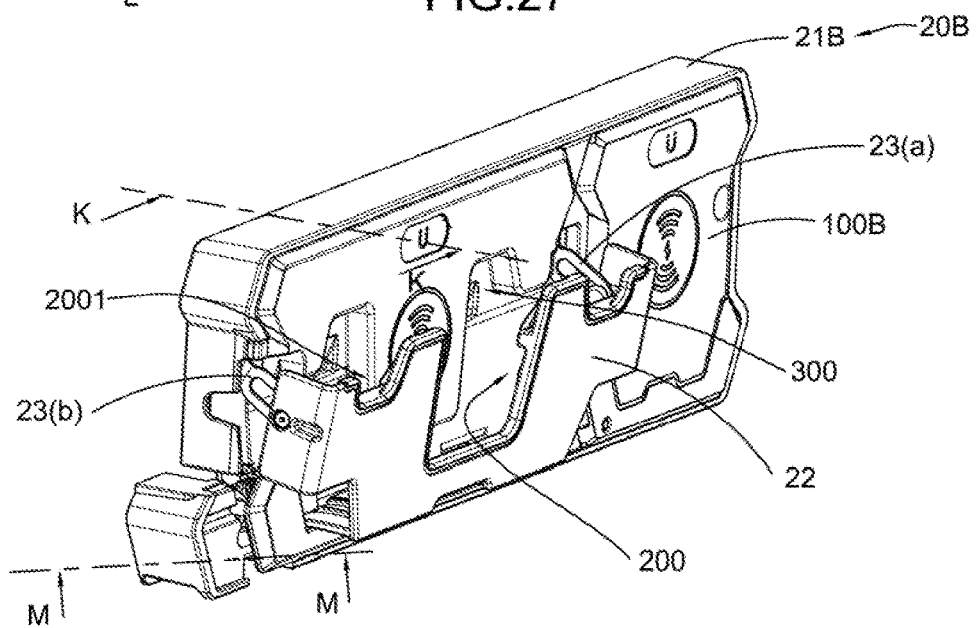
FIG. 28 is another perspective view of the charging station according to the above third preferred embodiment of the present invention, illustrating an outstretching state of the charging station.

The charging case has a retracting state and an outstretching state. In the retracting state, the holding member 22 is retracted to the case body 21B, so as to form a first charging surface 100a, as shown in FIG. 27. In the outstretching state, the holding member 22 is outstretched from the case body 21B, so as to form a holding room 200, as shown in FIG. 28.

It is worth mentioning that the case body 21B of the case 20B further defines a second charging surface 100B, so as to keep an electrical device. The charging station is able to keep at least two electrical devices at the same time.

Figure 38:
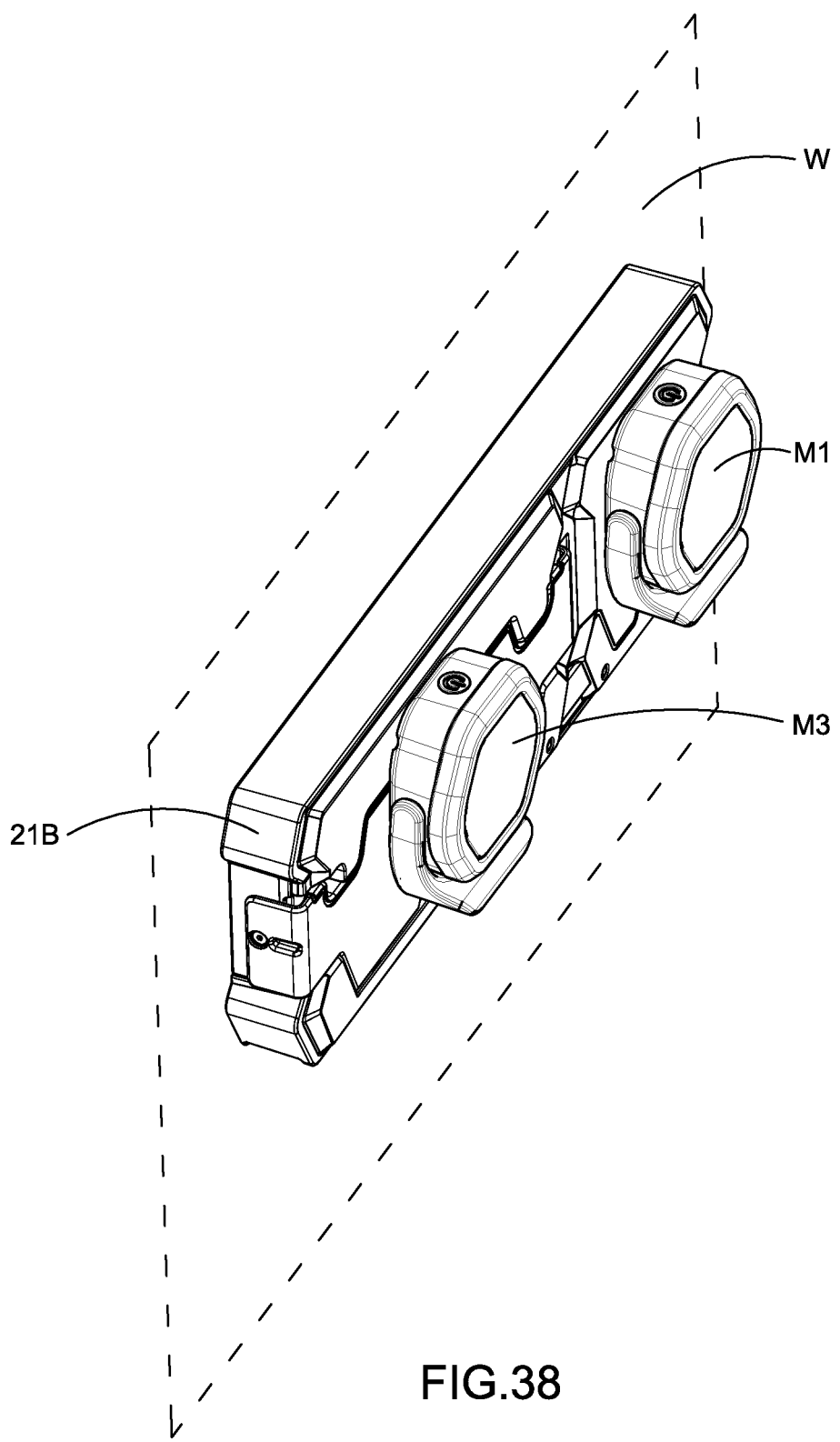
FIG. 38 is a perspective view of the charging station according to the above third preferred embodiment of the present invention, illustrating a first using state of the charging station.
Figure 39:
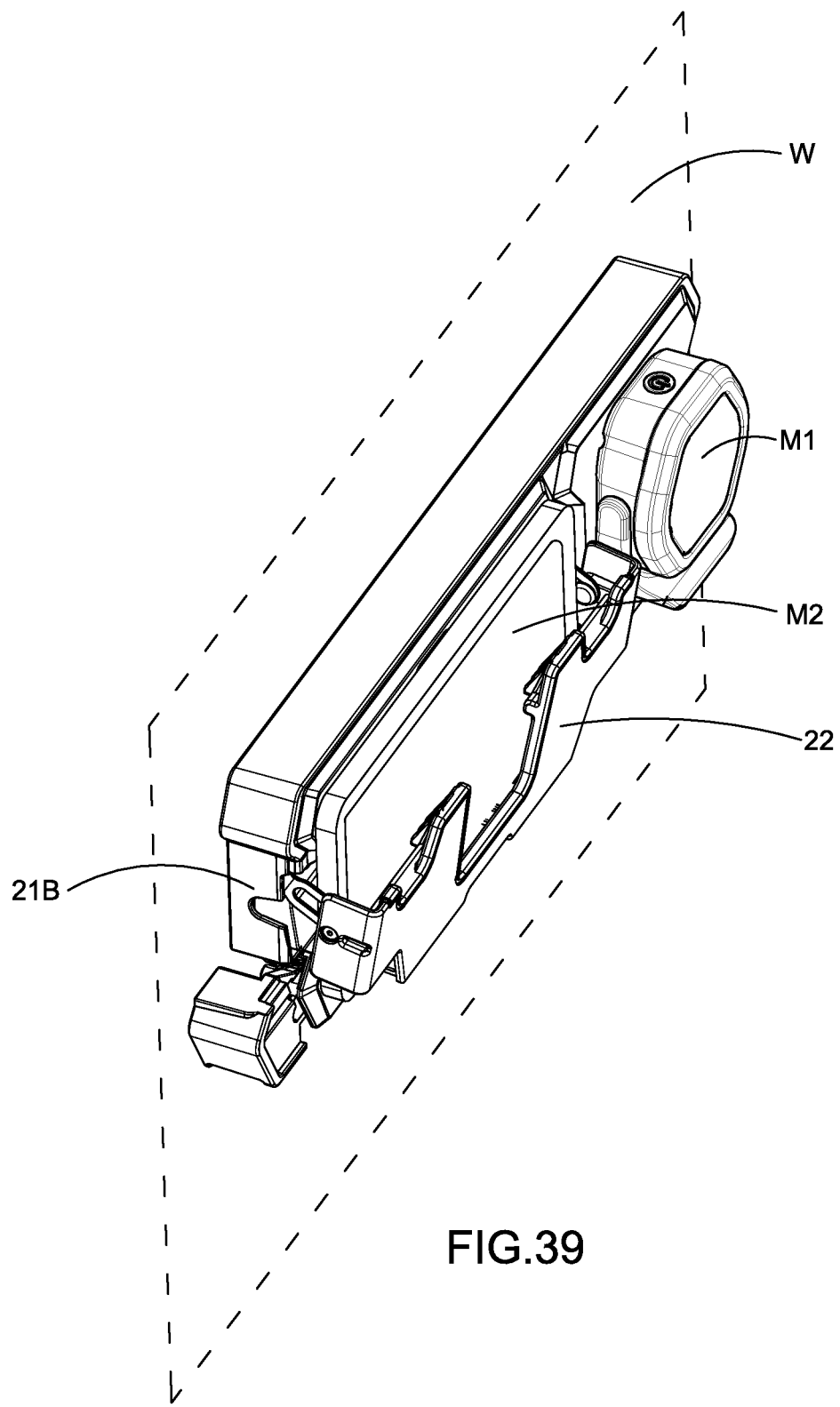
FIG. 39 is a perspective view of the charging station according to the above third preferred embodiment of the present invention, illustrating a second using state of the charging station.

Referring to FIG. 38 of the drawings, in the retracting state, a first electrical device M1 is capable of being kept to the first charging surface 100a and obtaining power from the power supply member 10B, and a third electrical device M3 is capable of being attached to the second charging surface 100B and obtaining power from the power supply member 10B. Referring to FIG. 39 of the drawings, in the outstretching state, a second electrical device M2 is capable of being held into the holding room 200 and obtaining power from the power supply member 10B, and the third electrical device M3 is capable of being kept to the second charging surface 100B and obtaining power from the power supply member 10B.

Figure 30:
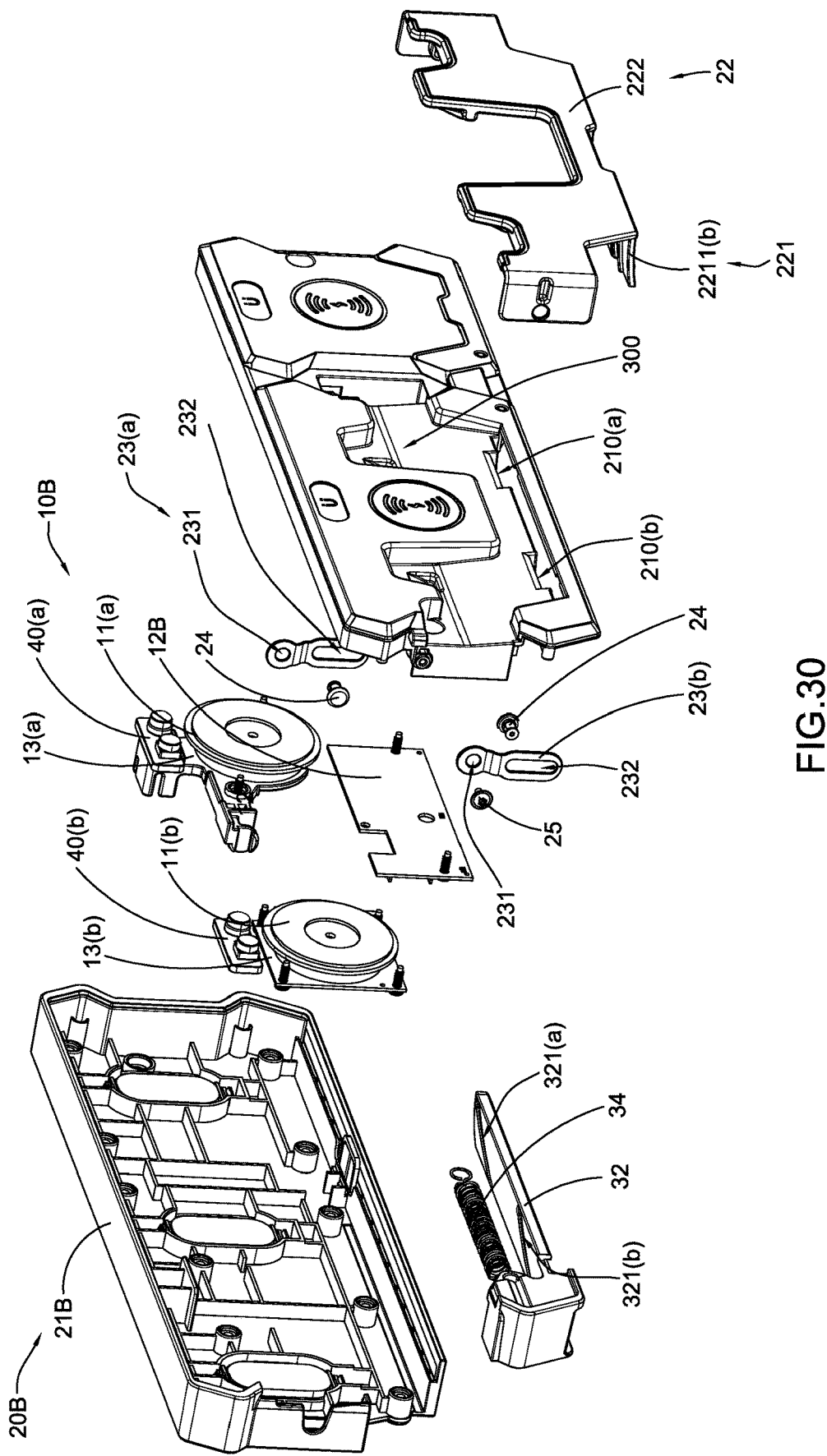
FIG. 30 is an exploded view of the charging station according to the above third preferred embodiment of the present invention.
Figure 31:
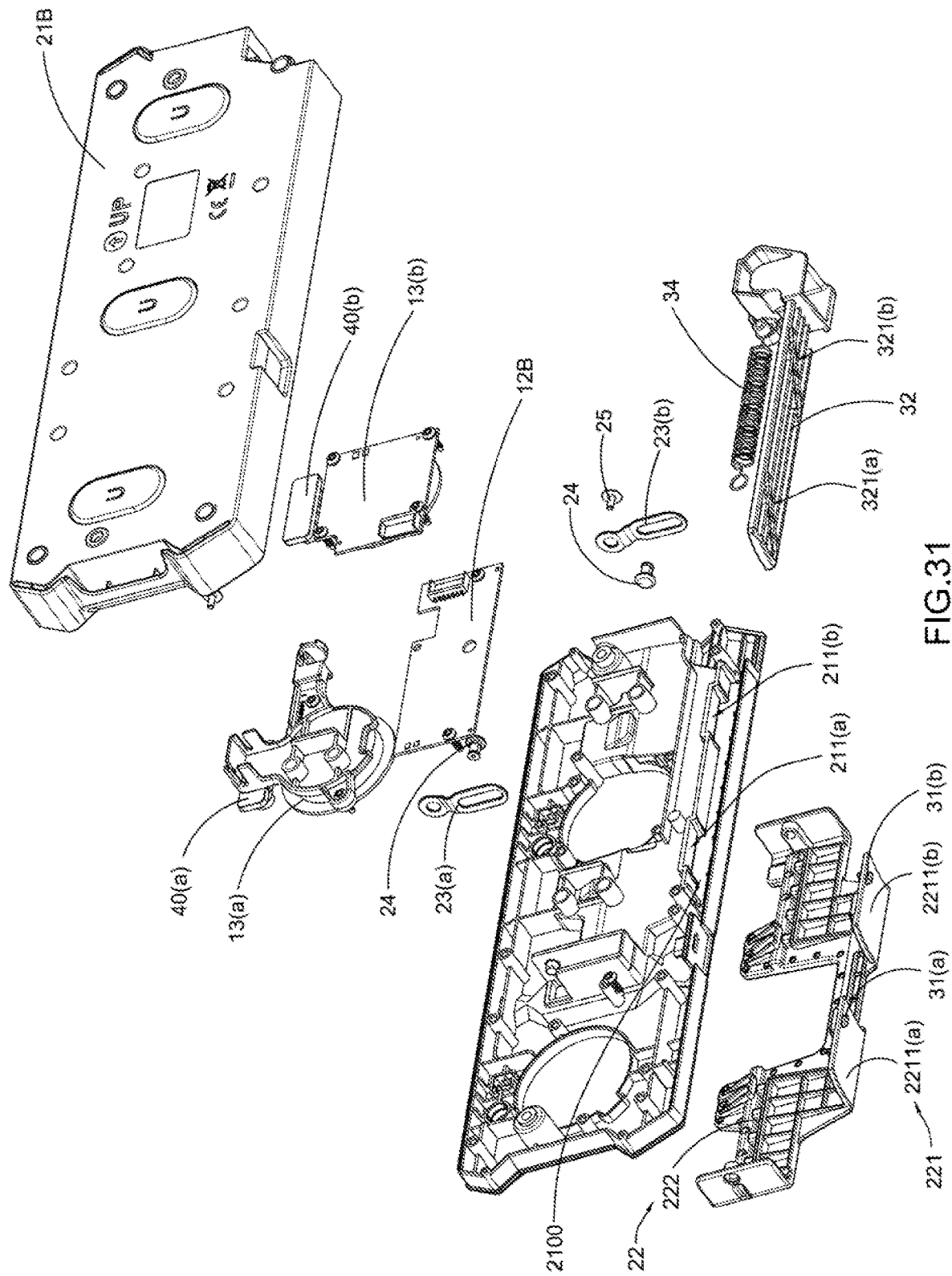
FIG. 31 is another exploded view of the charging station according to the above third preferred embodiment of the present invention.
Figure 32:
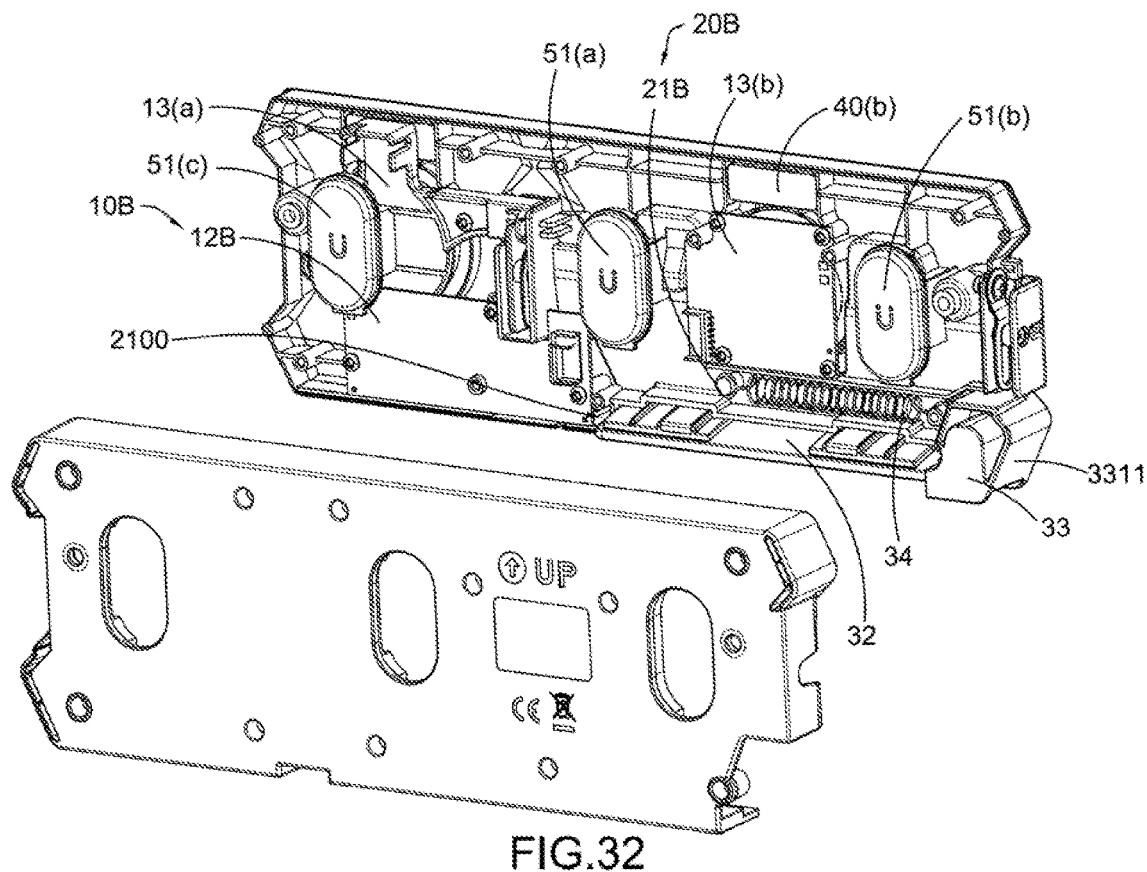
FIG. 32 is another exploded view of the charging station according to the above third preferred embodiment of the present invention.
Figure 33:
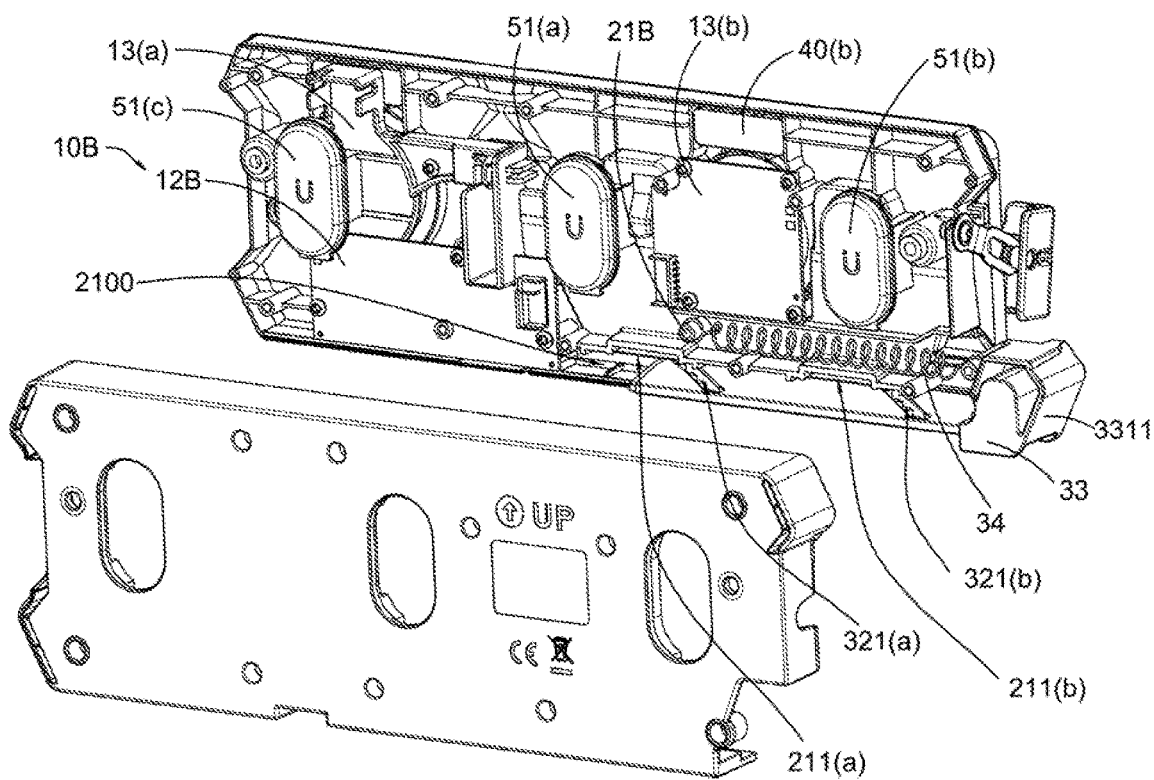
FIG. 33 is another exploded view of the charging station according to the above third preferred embodiment of the present invention.
Figure 34:
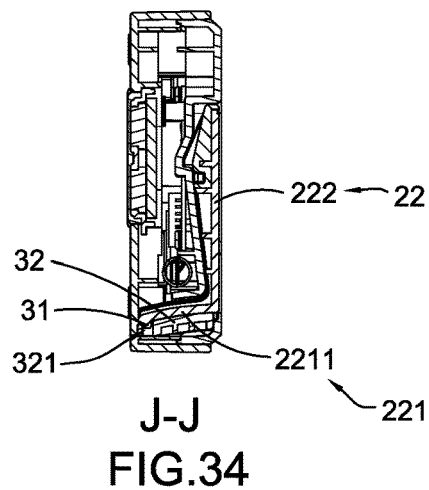
FIG. 34 is a sectional view along line I-I of FIG. 27.
Figure 35:
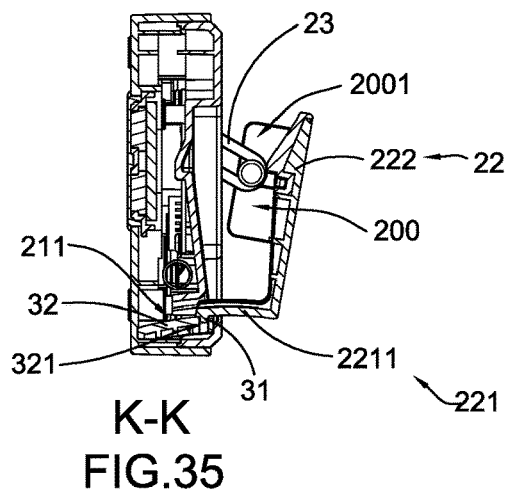
FIG. 35 is a sectional view along line J-J of FIG. 28.

As shown in FIG. 30 and FIG. 31 of the drawings, the holding member 22 comprises a bearing base 221 and a holding arm 222 integrally connected to the bearing base 221. In the outstretching state of the charging station, the second electrical device M2 is borne to the bearing base 221 and held by the holding arm 222, so that the second electrical device M2 is firmly held to the holding room 200.

The bearing base 221 comprises at least one base arm 2211. The case body 21B defines at least one extending channel 211, as can be shown in FIG. 23 and FIG. 25 of the drawings. The base arm 2211 is extended into the extending channel 211 and is able to move in the extending channel 211 along the extending direction of the extending channel 211.

It is worth mentioning that the base arm 2211 curvedly extends from the holding arm 222 to the extending channel 211, so that when the holding member 22 moves far away from the case body 21B, the holding member 22 rotates slightly, so that the holding room 200 has a wider opening 2001, so that the second electrical device M2 can be put into the holding room 200 more easily.

Referring to FIG. 28 of the drawings, the case 20B further comprises at least one reinforcing element 23 that connects the case body 21B and the holding member 22. In the outstretching state of the charging station, the reinforcing element 23 provides a reinforce connection between the case body 21B and the holding member 22, so that the second electrical device M2 is held in the holding room 200 more stably. In addition, in the outstretching state of the charging station, the reinforce connection between the case body 21B and the holding member 22 protects the holding member 22, so as to prevent the holding member 22 from being damaged by long-term oppression from the second electrical device.

Referring to FIG. 31 of the drawings, the reinforcing element 23 defines a rotating hole 231 and a sliding slot 232. The holding member 22 further comprises a first connecting element 24 and a second connecting element 25. The first connecting element 24 passes through the rotating hole 231 and connects the reinforcing element 23 to the case body 21B at a first connection position, so that the reinforcing element 23 is able to rotate in respect to the first connection position. The second connecting element 25 passes through the sliding slot 232 and connects the reinforcing element 23 to the holding member 22. The second connecting element 25 is fixed to a second connection position and is able to slide along the sliding slot 232. When the charging station switches between the retracting station and the outstretching station, the second connecting element 25 slides along the sliding slot 232.

According to this third preferred embodiment of the present invention, the bearing base 221 comprises a first base arm 2211a and a second base arm 2211b. Accordingly, the case body 21B defines a first extending channel 211a and a second extending channel 211b. The first base arm 2211a is extended into the first extending channel 211a and is able to move along the first extending channel 211a. The second base arm 2211b is extended into the second extending channel 211b and is able to move along the second extending channel 211b.

Specifically, in the outstretching state of the charging station, the first base arm 2211a is partially kept in the first extending channel 211a. In the process of the charging state being adjusted from the outstretching state to the retracting state, the first base arm 2211a gradually enters the first extending channel 211a. In the retracting state of the charging station, the first base arm 2211a is completely received into the first extending channel 211a. Similarly, in the outstretching state of the charging station, the second base arm 2211b is partially kept in the second extending channel 211b. In the process of the charging state being adjusted from the outstretching state to the retracting state, the second base arm 2211b gradually enters the second extending channel 211b. In the retracting state of the charging station, the second base arm 2211b is completely received into the second extending channel 211b.

Referring to FIG. 28 of the drawings, according to this third preferred embodiment of the present invention, the case 20B comprises a first reinforcing element 23a that connects the case body 21B and the holding member 22 and a second reinforcing element 23b that connects the case body 21B and the holding member 22. In the outstretching state of the charging station, the first reinforcing element 23a provides a reinforce connection between the case body 21B and the holding member 22, and the second reinforcing element 23b provides a reinforce connection between the case body 21B and the holding member 22.

As can be shown in FIG. 30 to FIG. 33, the case 20B further comprises a driving member 30. The driving member 30 drives the base arm 2211 to move back and forth in the extending channel 211, and further drives the retracting and outstretching of the holding member 22, in such a manner that the charging station can switch between the retracting state and the outstretching state.

The driving member 30 comprises at least one positioning element 31 and a guiding member 32. According to this third preferred embodiment of the present invention, the positioning element 31 is integrally protruded from the base arm 2211 of the holding member 22. When the guiding member 32 moves in a first direction, the positioning element 31 is driven to move in a second direction. The holding member 22 integrally connecting with the positioning element 31 is driven to retract or outstretch.

It is worth mentioning that, due to the base arm 2211 is curvedly extends from the holding arm 222 to the extending channel 211, the second direction is a curved direction perpendicular to the first direction.

As shown in FIG. 30 to FIG. 37, the guiding member 32 has at least one limiting slot 321 extending obliquely. The positioning element 31 is embedded into the limiting slot 321. When the guiding member 32 is driven to move, the positioning element 31 moves in the limiting slot 321. The limiting slot 321 has a first slot end 3211 and a second slot end 3212. The positioning element 31 is able to be driven to move between the first slot end 3211 and the second slot end 3212. As can be shown in FIG. 36 and FIG. 37, when the positioning element 31 reaches to the first slot end 3211, the holding member 22 is retracted to the case body 21B. When the first positioning element 31 reaches to the second slot end 3212, the holding member 22 is outstretched from the case body 21B.

In more detail, the case body 21B defines at least one through groove 210. The base arm 2211 pass through the through groove 210 and connect with the guiding member 32 in such a manner that the positioning element 31 integrally protruding from the base arm 2211 being stuck in the slot body 321.

According to this third preferred embodiment of the present invention, the guiding member 32 comprises a first limiting slot 321a and a second limiting slot 321b. The driving member 30 comprises a first positioning element 31a and a second positioning element 31b. The first positioning element 31a is integrally protruded from the first base arm 2211a of the holding member 22. When the guiding member 32 moves along a first direction, the first positioning element 31a is driven to move in the second direction perpendicular to the first direction, and the holding member 22 integrally connecting with the first positioning element 31a is driven to retract or outstretch.

The first positioning element 31a is installed into the first limiting slot 321a. When the guiding member 32 is driven to move, the first positioning element 31a moves in the first limiting slot 321a. The first limiting slot 321a has a first slot end 3211a and a second slot end 3212a. The first positioning element 31a is able to be driven to move between the first slot end 3211a and the second slot end 3212a. When the first positioning element 31a reaches to the first slot end 3211a, the holding member 22 is retracted to the case body 21B. When the first positioning element 31a reaches to the second slot end 3212a, the holding member 22 is outstretched from the case body 21B. The second positioning element 31b is installed into the second limiting slot 321b. When the guiding member 32 is driven to move, the second positioning element 31b moves along the second limiting slot 321b. The second limiting slot 321b has a first slot end 3211b and a second slot end 3212b. The second positioning element 31b is able to be driven to move between the first slot end 3211b and the second slot end 3212b. When the second positioning element 31b reaches to the first slot end 3211b, the holding member 22 is retracted to the case body 21B. When the second positioning element 31b reaches to the second slot end 3212b, the holding member 22 is outstretched from the case body 21B.

The case body 21B defines a first through groove 210a and a second through groove 210b. The first base arm 2211a pass through the first through groove 210a and connect with the guiding member 32 in such a manner that the first positioning element 31a integrally protruding from the first base arm 2211a being stuck in the first slot body 321a. The second base arm 2211b pass through the second through groove 210b and connect with the guiding member 32 in such a manner that the second positioning element 31b integrally protruding from the second base arm 2211b being stuck in the second slot body 321b.

The driving member 30 further comprises an operating portion 33. The driving member 30 drive the guiding member 32 to move in the first direction.

According to this third preferred embodiment of the present invention, the operating portion 33 comprise an operating element 331 integrally connected with the guiding member 32. The guiding member 32 receives an external force that can drive the guiding member 32 to move in the first direction.

In detail, the operating element 331 has a first bearing surface 3311 and a second bearing surface 3312. When the external force is applied to the first bearing surface 3311, the operating element 331 is pushed to move in the first direction, and the guiding member 32 integrally connected with the operating element 331 is driven to move in the first direction, so that the charging station can be switched from the outstretching state to the retracting state. When the external force is applied to the second bearing surface 3312, the operating element 331 is pulled to move in the opposite direction in the first direction, and the guiding member 32 integrally connected with the operating element 331 is driven to move in the opposite direction in the first direction, so that the charging station can be switched from the retracting state to the outstretching state.

Figure 29:
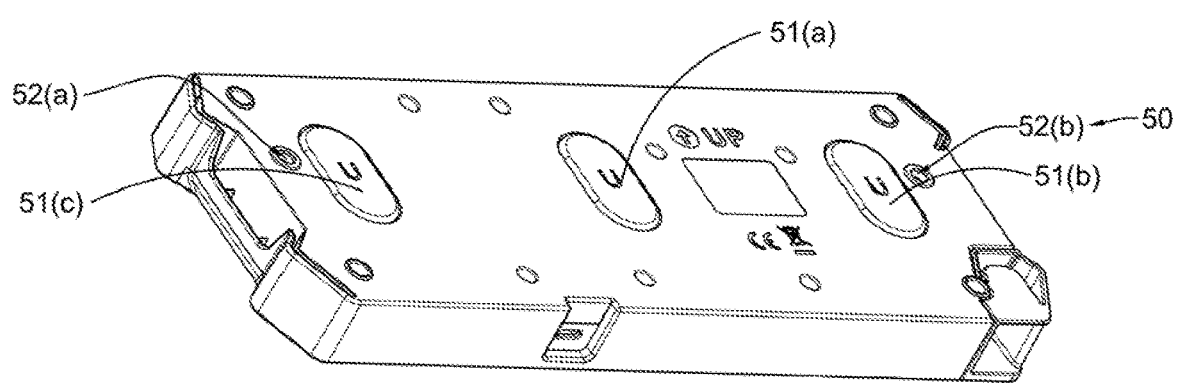
FIG. 29 is another perspective view of the charging station according to the above third preferred embodiment of the present invention.

As can be shown in FIG. 29 of the present invention, the operating element 331 defines an operation cave 3310, in which a finger of an operator can reach and touch the second bearing surface 3312 to apply an external force to the operating element 331.

The driving member 30 further comprises an elastic element 34 that connects the operating element 331 and the case body 21B. According to this third preferred embodiment of the present invention, the elastic element is embodied as a spring.

In a relaxed state of the elastic element 34, the charging station is kept in the retracting state. When an external force is applied to the second bearing surface 3312 of the operating element 331, the external force resists a restoring force of the elastic element 34 and drives the guiding member 32 to remove in the opposite direction in the first direction, and the first positioning element 31a is driven by the guiding member 32

In detail, the case body 21B defines an extending space 2100. The guiding member 32 is extended into the extending space 2100. In the relaxed state of the elastic element 34, the guiding member 32 is kept to a predetermined position in the extending space, so that the first limiting slot 321a and the second limiting slot 321b are respectively kept to corresponding positions, and the first positioning element 31a and the second positioning element 31b are respectively positioned to corresponding positions that makes the holding member 22 being retracted to the case body 21B.

When a pulling force is applied to the second bearing surface 3312 of the operating element 331 of the operating portion 33, the guiding member 32 is driven to move in the positive direction of the first direction. The first limiting slot 321a drives the first positioning element 31a to move in the first limiting slot 321a, and the holding member 22 integrally connecting with the first positioning element 31a is driven to move away from the case body 21B, so that the charging station is switched to the outstretching state.

According to this third preferred embodiment of the present invention, the second limiting slot 321b has a same shape with the first limiting slot 321a and the extending direction of the second limiting slot 321b is parallel to the extending direction of the first limiting slot 321a. When the pulling force is applied to the second bearing surface 3312 of the operating element 331 of the operating portion 33, and the guiding member 32 is driven to move in the positive direction of the first direction. The second limiting slot 321b drives the second positioning element 31b to move in the second limiting slot 321b, and the holding member 22 integrally connecting with the first positioning element 31a and the second positioning element 31b is driven to move away from the case body 21B under the combined effect of the first positioning element 31a and the second positioning element 31b, so that the charging station is switched to the outstretching state, and the holding room 200 suitable for holding the second electrical device is formed.

In the outstretching state of the charging station, the elastic element 34 is in a stretched state and has a tendency to recover. After the second electrical device is put into the holding room, the elastic element 34 having the recover tendency provides a pulling force to the operating element 331. Under the linkage of the elastic element 34, the operating portion 33, the guiding member 32, the first positioning element 31a and the second positioning element 31b, the holding member 22 has a tendency to retract to the case body 21B, so that the second electrical device can be held to the holding room 200 more firmly.

Figure 36:
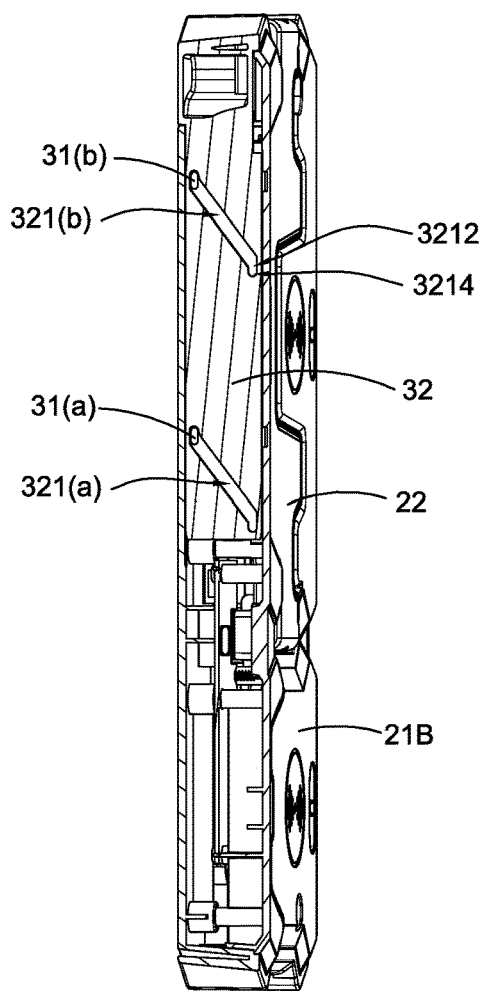
FIG. 36 is a sectional view along line K-K of FIG. 27.
Figure 37:
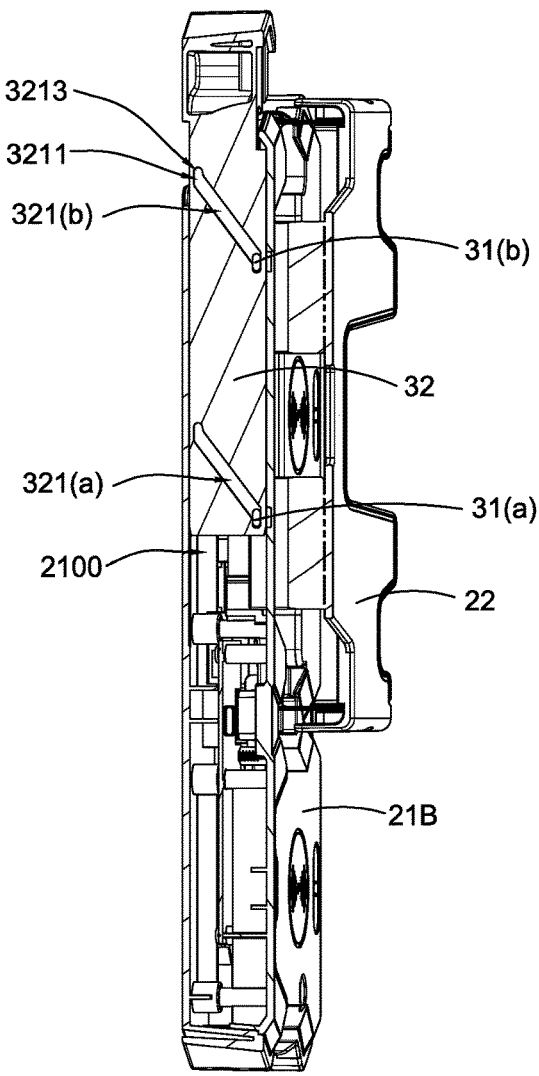
FIG. 37 is a sectional view along line L-L of FIG. 28.

It is worth mentioning that, in the outstretching state of the charging station, the holding member 22 can be held to the outstretching position, so that the second electrical device can be conveniently place into the holding room. Referring to FIG. 36 and FIG. 37 of the drawings, the limiting slot 321 further defines a first extending part 3213 that penetrates to the first slot end 3211 and a second extending part 3214 that penetrates to the second slot end 3212. When the positioning element 31 partially reaches to the extending part 3213, the force from the elastic element 34 alone cannot easily drive the guiding member 32 to move in the opposite direction of the first direction and further drive the holding member 22 to retract to the case body 21B. After a pushing force is applied to the first bearing surface 3311, the elastic element 34 pulls the operating portion 33 and the guiding member 32 integrally formed to the operating element to move in the opposite direction of the first direction. If the second electrical device is in the holding room 200, by the driving of the guiding member 32, the holding member 22 moves toward the second electrical device to hold the second electrical device M2 more firmly. If nothing is held in the holding room 200, by the driving of the guiding member 32, the holding member 22 moves toward the case body 21B and retracts to the case body 21B. The electronic device is able to attach to the first charging surface 100a to charge power.

In detail, the case body 21B defines a receiving groove 300. In the retracting state of the charging station, the holding member 22 is received into the receiving groove 300, so as to the first electrical device M1 is attached to the first charging surface 100a to charge power.

According to this third preferred embodiment of the present invention, the first electrical device M1 is magnetically kept to the first charging surface 100a. The third electrical device M3 is magnetically kept to the second charging surface 100B. In detail, the charging station form comprises at least one magnetic unit 40 that provides a magnetic attraction. According to this third preferred embodiment of the present invention, the charging station form comprises a first magnetic unit 40a and a second magnetic unit 40b.

It is worth mentioning that the first electrical device M1 is magnetic or is able to be attracted by the magnetic unit 40a. In other words, the first electrical device M1 comprises a magnetic mating member. In the retracting state of the charging station, under the action of the magnetic unit 40, the first electrical device M1 is kept to the first charging surface 100a.

Similarly, the third electrical device M3 is magnetic or is able to be attracted by the magnetic unit 40b. In other words, the third electrical device M3 comprises another magnetic mating member. Whether in the retracting state or the outstretching state of the charging station, under the action of the magnetic unit 40b, the third electrical device M3 is attached to the second charging surface 100B.

Referring to FIG. 30 of the drawings, the power supply member 10B comprises at least one power sending unit 11. According to this third preferred embodiment of the present invention, the power supply member 10B comprises a first power sending unit 11a and a second power sending unit 11b. In the retracting state, the first electrical device M1 kept to the first charging surface 100a is able to obtain power from the first power sending unit 11a. Whether in the outstretching state of in the retracting state, the third electrical device M3 kept to the second charging surface 100B is able to obtain power from the second power sending unit 11b. According to this third preferred embodiment of the present invention, the first power sending unit 11a is embodied as a first sending coil, and the second power sending unit 11b is embodied as a second sending coil.

The power supply member 10B further comprises at least one power getting unit 12B getting power from an external circuit. The first power sending unit 11a and the second power sending unit 11b are electrically connected with the power getting unit 12B respectively, so that the power supply member 10B is able to obtain the power from the external circuit and send the power to the electrical device kept to the case 20B, such as the first electrical device being kept to the first charging surface 100a, the second electrical device being held to the holding room 200, or the third electrical device being kept to the third charging surface 100B.

Referring to FIG. 30 and FIG. 31 of the drawings, the power supply member 10B further comprises at least one power storage unit 13 electrically connecting with both the power storage unit 13 and the power sending unit 11. Power got by the power getting unit 12B can be stored to the power storage unit 13. The power sending unit 11 obtains power from the power storage unit 13 and sends power to the electrical devices.

It is worth mentioning that, when the power getting unit 12B is electrically disconnected from the external circuit, the power sending unit 11 still can obtains power storage to the power storage unit 13 and sends power to the electrical device.

According to this third preferred embodiment of the present invention, the power supply member 10B comprises a first power storage unit 13a and a second power storage unit 13b. The first power storage unit 13a is electrically connected with both the power getting unit 12B and the first power sending unit 11a. The second power storage unit 13b is electrically connected with both the power getting unit 12B and the second power sending unit 11b. Power got by the power getting unit 12B can be stored to the first power storage unit 13a and the second power storage unit 13b. The first power sending unit 11a obtains power from the first power storage unit 13a and sends power to the third electrical device M3. The second power sending unit 11b obtains power from the second power storage unit 13b and sends power to the first electrical device M1 or the second electrical device M2.

The charging station further comprises a wall-mounted member 50 coupled to the case body 21B, so that the charging station is able to be mounted to a wall W. Referring to FIG. 38 of the drawings, the charging station is side mounted to the wall. In the retracting station of the charging station, the first electrical device M1, such as a work light is kept to the first charging surface 100a. The work light that is kept to the first charging surface 100a and obtains power from the power supply member 10B is able to provide low-level lighting. A user who needs to take the work light to another place to use can take the work light from the charging station and catch the work light to where needed. At the same time, the third electrical device M3, such as another work light is kept to the second charging surface 100B.

Referring to FIG. 39 of the drawings, the charging station is side mounted to the wall. In the outstretching station of the charging station, the second electrical device M2, such as a mobile phone is held to the holding room 200. The mobile phone that is held to the holding room 200 and obtains power from the power supply member 10B is able to be obtained easily. When he/she working in a workshop needs to charge his/her mobile phone, he/she can conveniently place his/her mobile phone into the holding room 200. When he/she needs the mobile phone, he/she can easily take it away. At the same time, the third electrical device M3, such as another work light is kept to the second charging surface 100B.

Referring to FIG. 29 of the drawings, the wall-mounted member 50 comprises at least one magnetic element 51 fixed to the case body 21B, so that the charging station is capable of being magnetically installed to a magnetic wall or an iron wall.

As can be shown in FIG. 29 of the drawings, the wall-mounted member 50 further comprises at least one hole 52 formed to the case body 21B, so as to convenient the charging station to be installed on the wall by punching and fixing.

According to this third preferred embodiment of the present invention, the wall-mounted member 50 comprises a first magnetic element 51a, a second magnetic element 51b, a third magnetic element 51c, a first hole 52a, and a second hole 52b.

Referring to FIG. 40 to FIG. 52 of the drawings, a charging station according to a fourth preferred embodiment of the present invention is illustrated. The charging station comprises at least one power supply member 10B and a case 20C. The power supply member 10B is installed to the case 20C. The case 20C comprises a case body 21C and a holding member 22.

Figure 40:
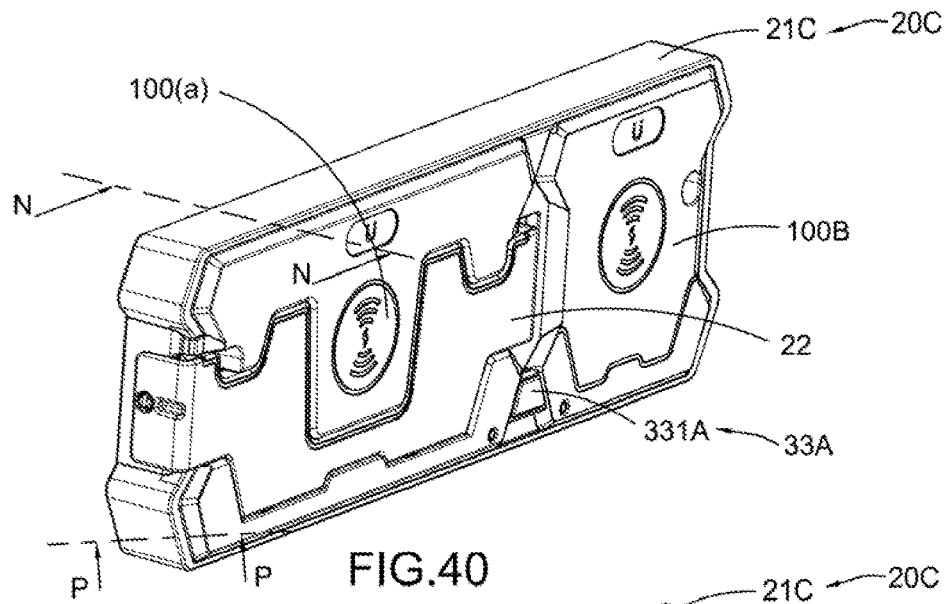
FIG. 40 is a perspective view of a charging station according to a fourth preferred embodiment of the present invention, illustrating a retracting state of the charging station.
Figure 41:
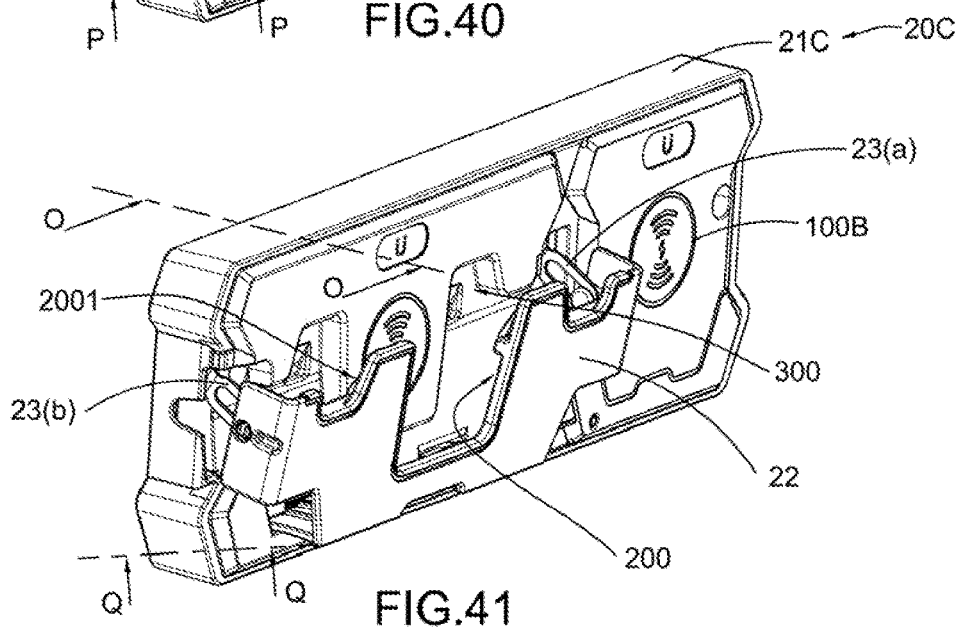
FIG. 41 is another perspective view of the charging station according to the above fourth preferred embodiment of the present invention, illustrating an outstretching state of the charging station.

The charging case has a retracting state and an outstretching state. In the retracting state, the holding member 22 is retracted to the case body 21C, so as to form a first charging surface 100a, as shown in FIG. 40. In the outstretching state, the holding member 22 is outstretched from the case body 21C, so as to form a holding room 200, as shown in FIG. 41.

It is worth mentioning that the case body 21C of the case 20C further defines a second charging surface 100B, so as to keep an electrical device. The charging station is able to keep at least two electrical devices at the same time.

Figure 51:
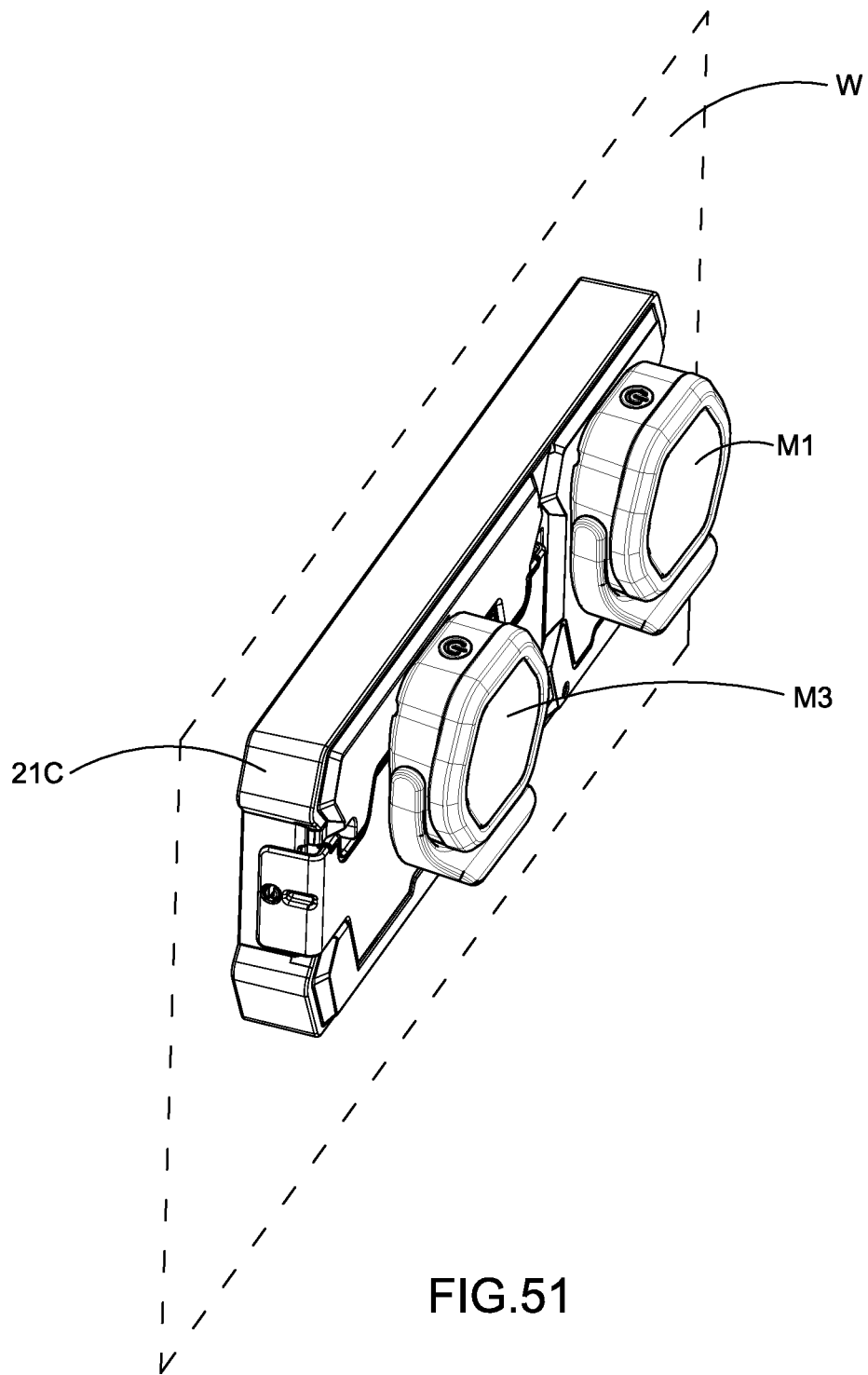
FIG. 51 is a perspective view of the charging station according to the above fourth preferred embodiment of the present invention, illustrating a first using state of the charging station.
Figure 52:
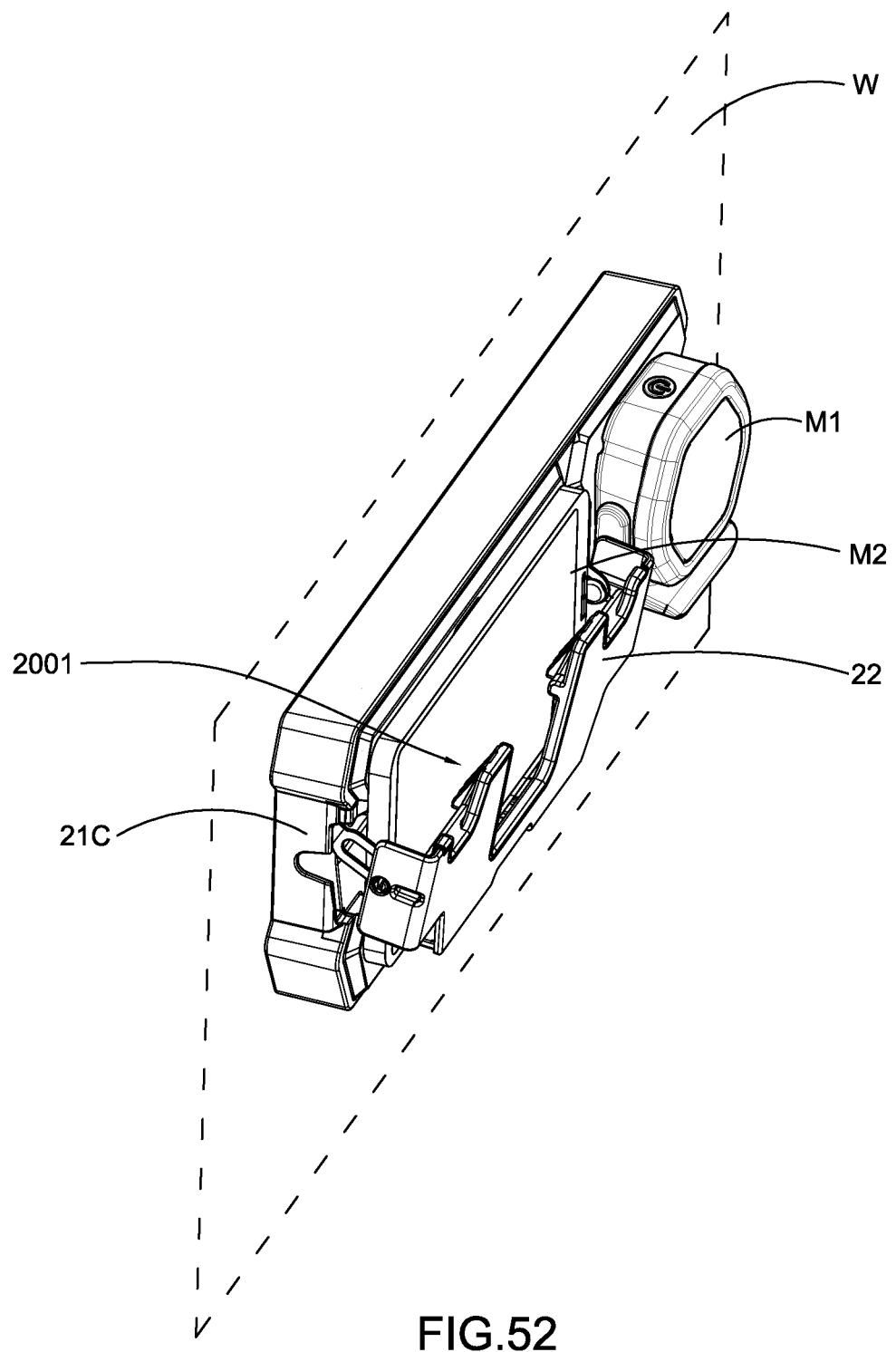
FIG. 52 is a perspective view of the charging station according to the above fourth preferred embodiment of the present invention, illustrating a second using state of the charging station.

Referring to FIG. 51 of the drawings, in the retracting state, a first electrical device M1 is capable of being kept to the first charging surface 100a and obtaining power from the power supply member 10B, and a third electrical device M3 is capable of being kept to the second charging surface 100B and obtaining power from the power supply member 10B. Referring to FIG. 52 of the drawings, in the outstretching state, a second electrical device M2 is capable of being held into the holding room 200 and obtaining power from the power supply member 10B, and the third electrical device M3 is capable of being kept to the second charging surface 100B and obtaining power from the power supply member 10B.

Figure 43:
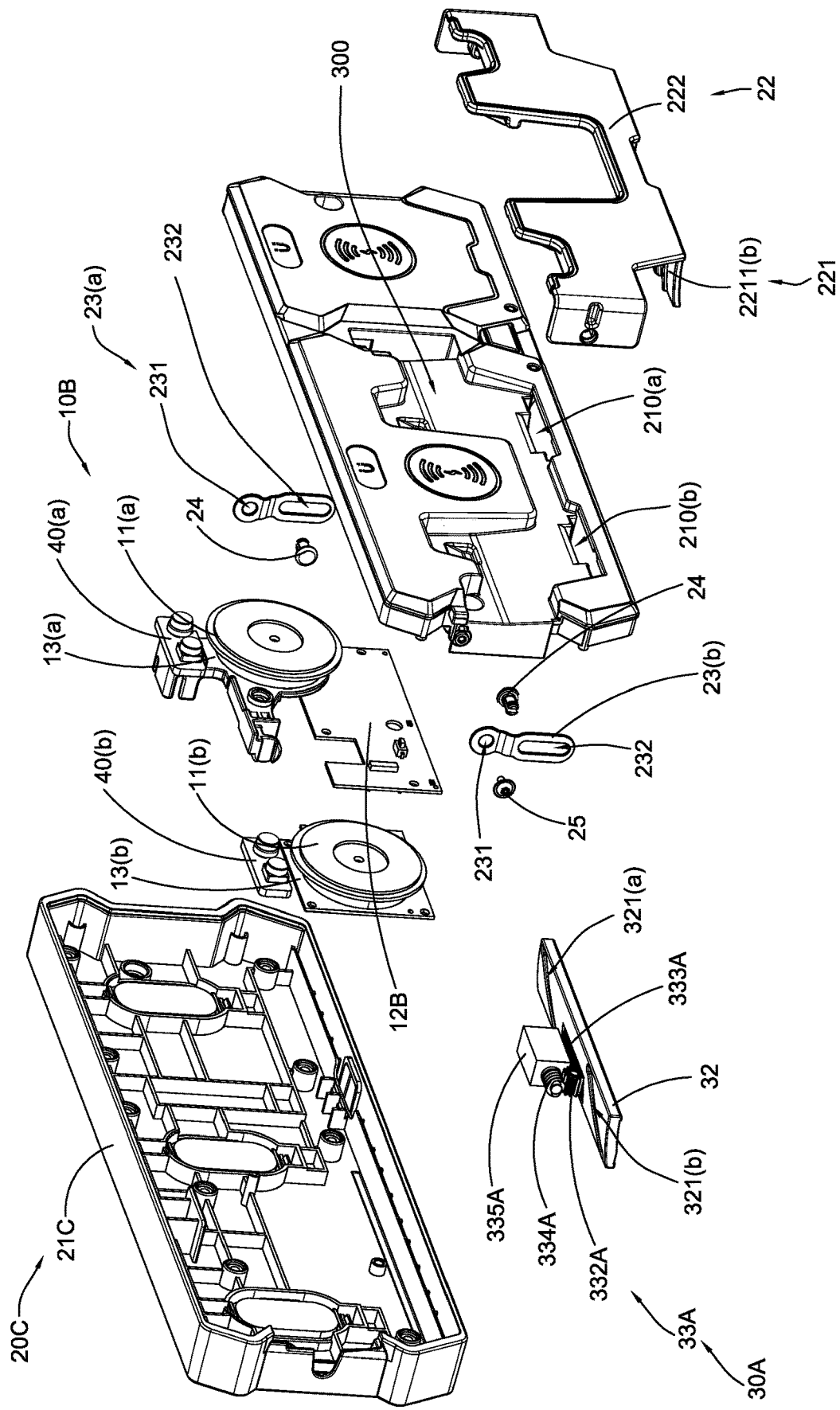
FIG. 43 is an exploded view of the charging station according to the above fourth preferred embodiment of the present invention.
Figure 44:
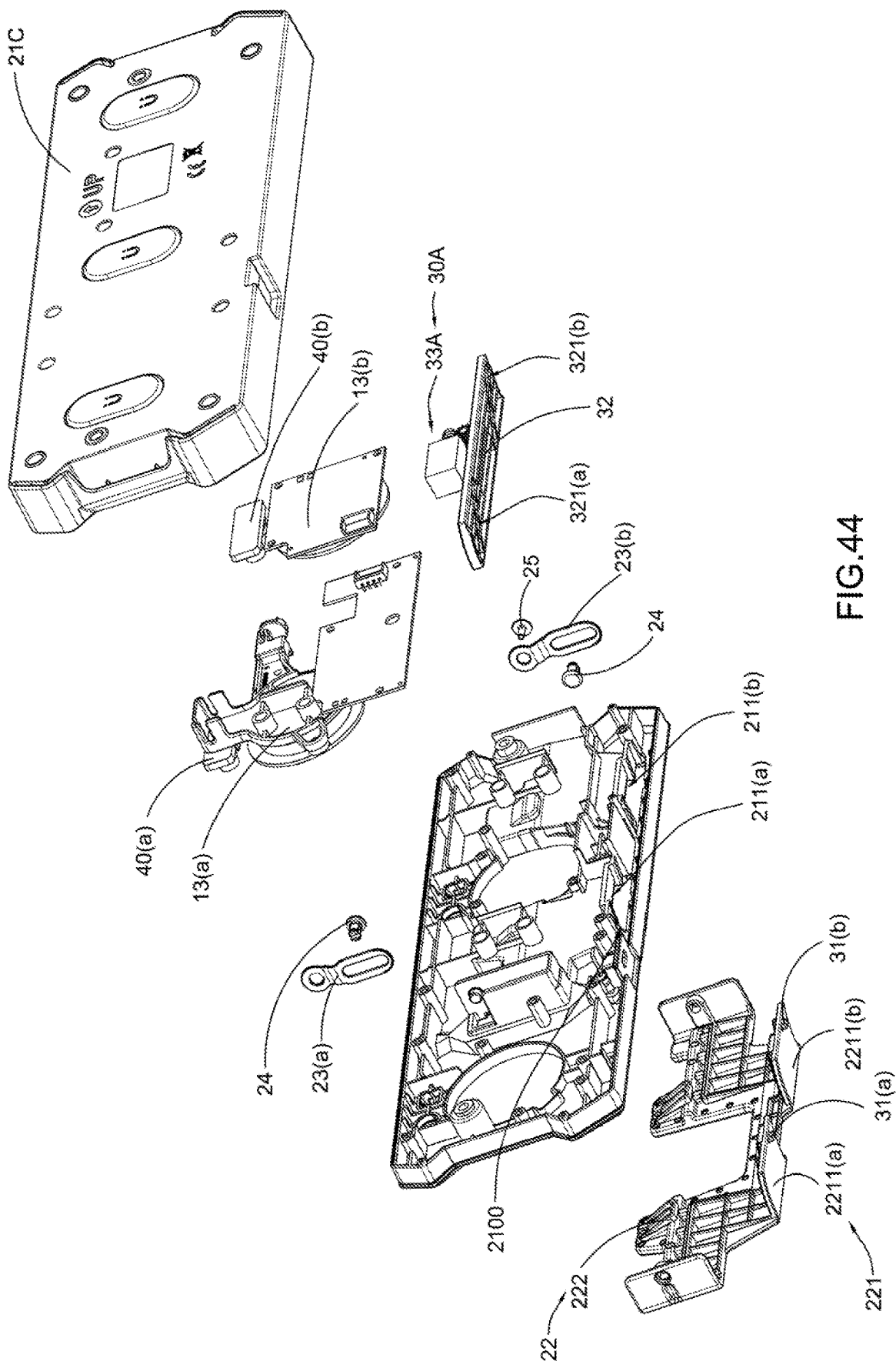
FIG. 44 is another exploded view of the charging station according to the above fourth preferred embodiment of the present invention.
Figure 45:
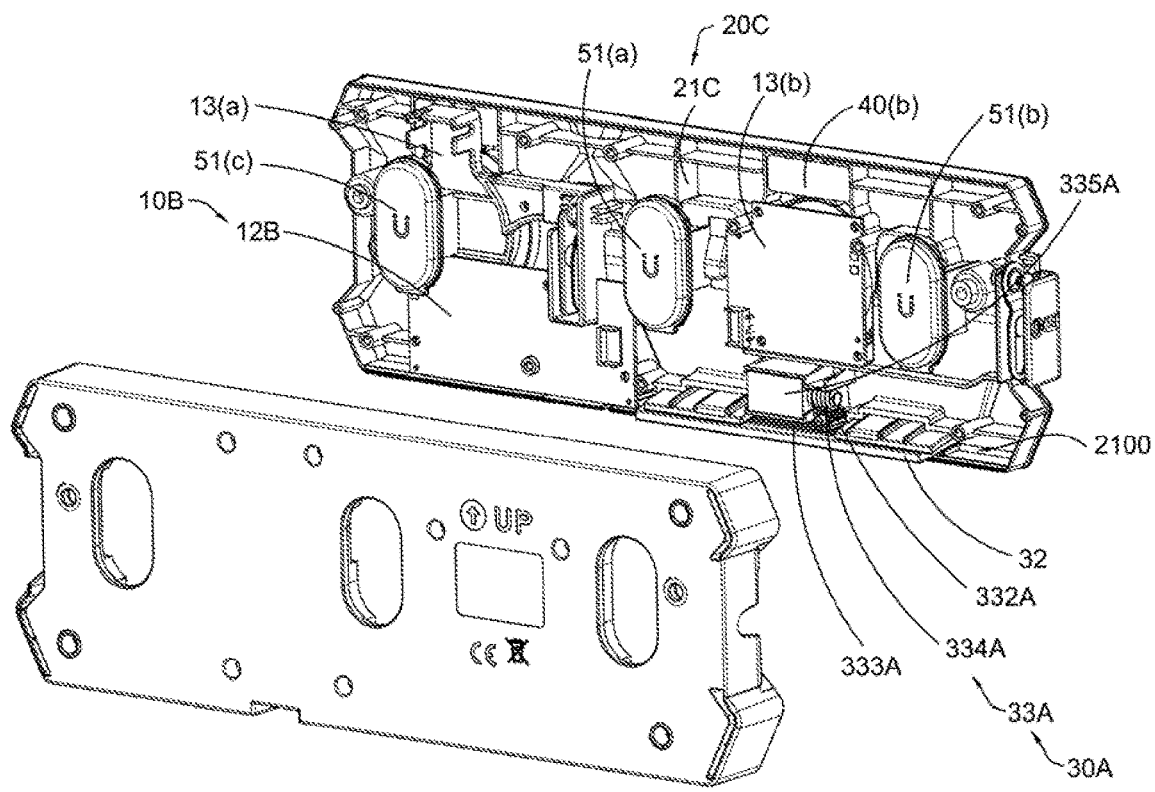
FIG. 45 is another exploded view of the charging station according to the above fourth preferred embodiment of the present invention.
Figure 46:
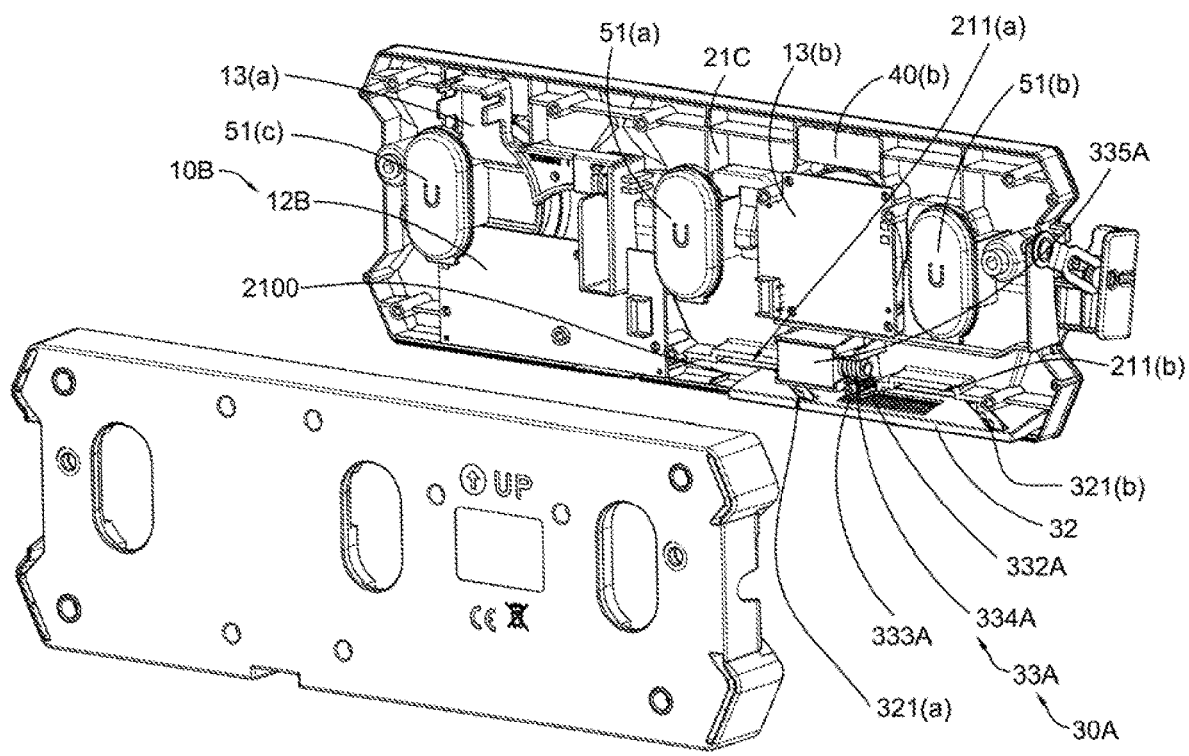
FIG. 46 is another exploded view of the charging station according to the above fourth preferred embodiment of the present invention.
Figure 47:
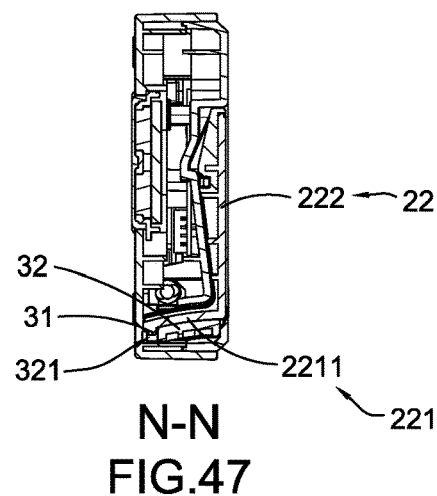
FIG. 47 is a sectional view along line M-M of FIG. 40.
Figure 48:
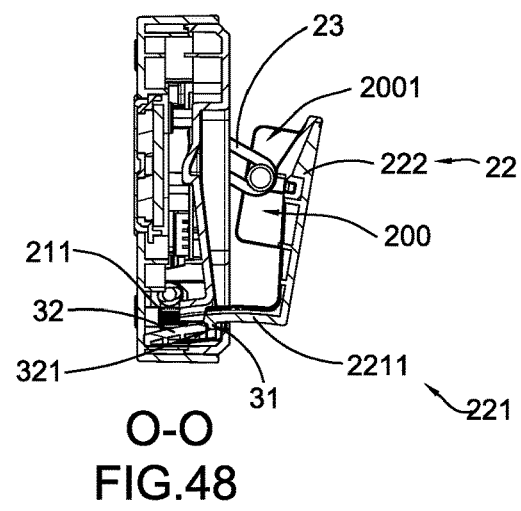
FIG. 48 is a sectional view along line N-N of FIG. 41.
Figure 49:
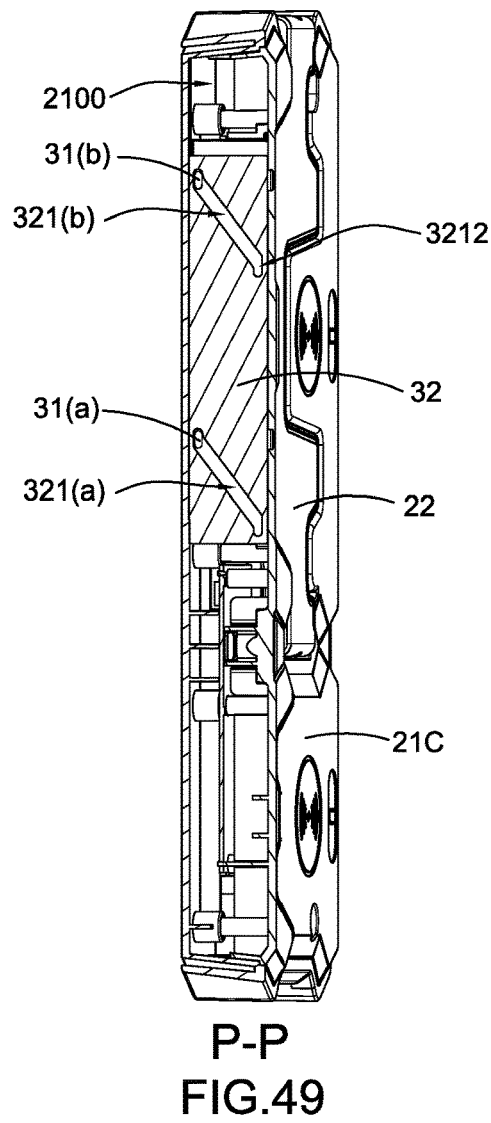
FIG. 49 is a sectional view along line O-O of FIG. 40.
Figure 50:
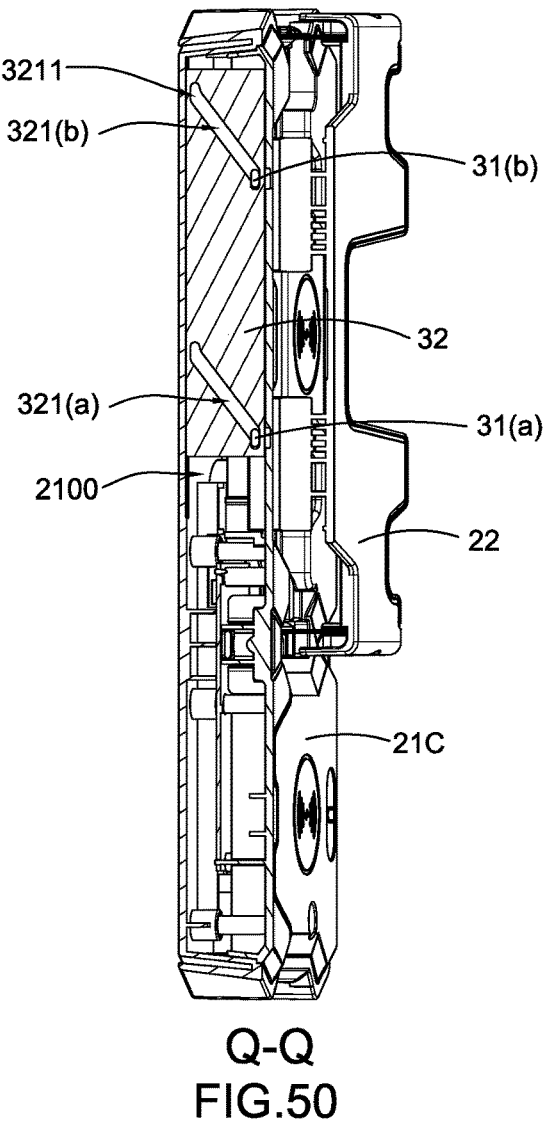
FIG. 50 is a sectional view along line P-P of FIG. 41.

As shown in FIG. 43 and FIG. 44 of the drawings, the holding member 22 comprises a bearing base 221 and a holding arm 222 integrally connected to the bearing base 221. In the outstretching state of the charging station, the second electrical device M2 is borne to the bearing base 221 and held by the holding arm 222, so that the second electrical device M2 is firmly held to the holding room 200.

The bearing base 221 comprises at least one base arm 2211. The case body 21C defines at least one extending channel 211, as can be shown in FIG. 36 and FIG. 38 of the drawings. The base arm 2211 is extended into the extending channel 211 and is able to move in the extending channel 211 along the extending direction of the extending channel 211.

It is worth mentioning that the base arm 2211 curvedly extends from the holding arm 222 to the extending channel 211, so that when the holding member 22 moves far away from the case body 21C, the holding member 22 rotates slightly, so that the holding room 200 has a wider opening 2001, so that the second electrical device M2 can be put into the holding room 200 more easily.

Referring to FIG. 41 of the drawings, the case 20C further comprises at least one reinforcing element 23 that connects the case body 21C and the holding member 22. In the outstretching state of the charging station, the reinforcing element 23 provides a reinforce connection between the case body 21C and the holding member 22, so that the second electrical device M2 is held in the holding room 200 more stably. In addition, in the outstretching state of the charging station, the reinforce connection between the case body 21C and the holding member 22 protects the holding member 22, so as to prevent the holding member 22 from being damaged by long-term oppression from the second electrical device.

Referring to FIG. 44 of the drawings, the reinforcing element 23 defines a rotating hole 231 and a sliding slot 232. The holding member 22 further comprises a first connecting element 24 and a second connecting element 25. The first connecting element 24 passes through the rotating hole 231 and connects the reinforcing element 23 to the case body 21C at a first connection position, so that the reinforcing element 23 is able to rotate in respect to the first connection position. The second connecting element 25 passes through the sliding slot 232 and connects the reinforcing element 23 to the holding member 22. The second connecting element 25 is fixed to a second connection position and is able to slide along the sliding slot 232. When the charging station switches between the retracting station and the outstretching station, the second connecting element 25 slides along the sliding slot 232.

According to this fourth preferred embodiment of the present invention, the bearing base 221 comprises a first base arm 2211a and a second base arm 2211b. Accordingly, the case body 21C defines a first extending channel 211a and a second extending channel 211b. The first base arm 2211a is extended into the first extending channel 211a and is able to move along the first extending channel 211a. The second base arm 2211b is extended into the second extending channel 211b and is able to move along the second extending channel 211b.

Specifically, in the outstretching state of the charging station, the first base arm 2211a is partially kept in the first extending channel 211a. In the process of the charging state being adjusted from the outstretching state to the retracting state, the first base arm 2211a gradually enters the first extending channel 211a. In the retracting state of the charging station, the first base arm 2211a is completely received into the first extending channel 211a. Similarly, in the outstretching state of the charging station, the second base arm 2211b is partially kept in the second extending channel 211b. In the process of the charging state being adjusted from the outstretching state to the retracting state, the second base arm 2211b gradually enters the second extending channel 211b. In the retracting state of the charging station, the second base arm 2211b is completely received into the second extending channel 211b.

Referring to FIG. 41 of the drawings, according to this fourth preferred embodiment of the present invention, the case 20C comprises a first reinforcing element 23a that connects the case body 21C and the holding member 22 and a second reinforcing element 23b that connects the case body 21C and the holding member 22. In the outstretching state of the charging station, the first reinforcing element 23a provides a reinforce connection between the case body 21C and the holding member 22, and the second reinforcing element 23b provides a reinforce connection between the case body 21C and the holding member 22.

As can be shown in FIG. 43 to FIG. 46, the case 20C further comprises a driving member 30A, so as to drive the base arm 2211 moving back and forth in the extending channel 211, and further drive the retracting and outstretching of the holding member 22, and further the charging station can switch between the retracting state and the outstretching state.

The driving member 30A comprises at least one positioning element 31 and a guiding member 32. According to this fourth preferred embodiment of the present invention, the positioning element 31 is integrally protruded from the base arm 2211 of the holding member 22. When the guiding member 32 moves in a first direction, the positioning element 31 is driven to move in a second direction perpendicular to the first direction, and the holding member 22 integrally connecting with the positioning element 31 is driven to retract or outstretch.

It is worth mentioning that, due to the base arm 2211 is curvedly extends from the holding arm 222 to the extending channel 211, the second direction is a curved direction perpendicular to the first direction.

As shown in FIG. 43 to FIG. 50, the guiding member 32 comprises at least one limiting slot 321 extending obliquely. The positioning element 31 is installed into the limiting slot 321. When the guiding member 32 is driven to move, the positioning element 31 moves in the limiting slot 321. The limiting slot 321 has a first slot end 3211 and a second slot end 3212. The positioning element 31 is able to be driven to move between the first slot end 3211 and the second slot end 3212. As can be shown in FIG. 49 and FIG. 50, when the positioning element 31 reaches to the first slot end 3211, the holding member 22 is retracted to the case body 21C. When the first positioning element 31 reaches to the second slot end 3212, the holding member 22 is outstretched from the case body 21C.

In more detail, the case body 21C defines at least one through groove 210. The base arm 2211 pass through the through groove 210 and connect with the guiding member 32 in such a manner that the positioning element 31 integrally protruding from the base arm 2211 being stuck in the slot body 321.

According to this fourth preferred embodiment of the present invention, the guiding member 32 comprises a first limiting slot 321a and a second limiting slot 321b. The driving member 30A comprises a first positioning element 31a and a second positioning element 31b. The first positioning element 31a is integrally protruded from the first base arm 2211a of the holding member 22. When the guiding member 32 moves along a first direction, the first positioning element 31a is driven to move in the second direction perpendicular to the first direction, and the holding member 22 integrally connecting with the first positioning element 31a is driven to retract or outstretch.

The first positioning element 31a is installed into the first limiting slot 321a. When the guiding member 32 is driven to move, the first positioning element 31a moves in the first limiting slot 321a. The first limiting slot 321a has a first slot end 3211a and a second slot end 3212a. The first positioning element 31a is able to be driven to move between the first slot end 3211a and the second slot end 3212a. When the first positioning element 31a reaches to the first slot end 3211a, the holding member 22 is retracted to the case body 21C. When the first positioning element 31a reaches to the second slot end 3212a, the holding member 22 is outstretched from the case body 21C. The second positioning element 31b is installed into the second limiting slot 321b. When the guiding member 32 is driven to move, the second positioning element 31b moves along the second limiting slot 321b. The second limiting slot 321b has a first slot end 3211b and a second slot end 3212b. The second positioning element 31b is able to be driven to move between the first slot end 3211b and the second slot end 3212b. When the second positioning element 31b reaches to the first slot end 3211b, the holding member 22 is retracted to the case body 21C. When the second positioning element 31b reaches to the second slot end 3212b, the holding member 22 is outstretched from the case body 21C.

The case body 21C defines a first through groove 210a and a second through groove 210b. The first base arm 2211a pass through the first through groove 210a and connect with the guiding member 32 in such a manner that the first positioning element 31a integrally protruding from the first base arm 2211a being stuck in the first slot body 321a. The second base arm 2211b pass through the second through groove 210b and connect with the guiding member 32 in such a manner that the second positioning element 31b integrally protruding from the second base arm 2211b being stuck in the second slot body 321b.

The driving member 30A further comprises operating portion 33AA, so as to drive the guiding member 32 to move in the positive and opposite direction of the first direction.

According to this fourth preferred embodiment of the present invention, the operating portion 33A comprise a gear 332A and a toothed bar structure 333A integrally formed to the guiding member 32. Referring to FIG. 19, when the gear 332A is driven to rotate in a first counterclockwise direction, the toothed bar structure 333A is driven to move in a positive direction of a first direction. The guiding member 32 integrally formed with the toothed bar structure 333A is driven to move in the positive direction of the first direction. Referring to FIG. 20, when the gear 332A is driven to rotate in a first clockwise direction, the toothed bar structure 333A is driven to move in an opposite direction of the first direction. The guiding member 32 integrally formed with the toothed bar structure 333A is driven to move in the opposite direction of the first direction. Hence, the charging station can be switched between the outstretching state and the retracting state.

In detail, the gear 332A meshes with the toothed bar structure 333A integrally formed to the guiding member 32. When the gear 332A is driven to rotate, the guiding member 32 is driven to move.

The operating portion 33A further comprises a screw 334A that meshes to the gear 333A. When the screw 334A is driven to rotate around a first axis L1, the gear 332A is driven to rotate around a second axis L2 perpendicular to the first axis L1, and further drives the guiding member 32 to move.

Furthermore, the driving member 30A further comprises a motor 335A that drive the screw 334A to rotate the first axis L1. Referring to FIG. 19, when the motor 335A drives the screw 334A to rotate in a second counterclockwise direction around a first axis L1. The screw 334A drives the gear 332A to rotate in the first counterclockwise direction around the second axis L2, and the toothed bar structure 333A is driven to move in a positive direction of a first direction. The guiding member 32 integrally formed with the toothed bar structure 333A is driven to move in the positive direction of the first direction. Referring to FIG. 20, when the motor 335A drives the screw 334A to rotate in a second clockwise direction around the first axis L1. The screw 334A drives the gear 332A to rotate in the first clockwise direction around the second axis L2, and the toothed bar structure 333A is driven to move in an opposite direction of the first direction. The guiding member 32 integrally formed with the toothed bar structure 333A is driven to move in the opposite direction of the first direction. Hence, the charging station can be switched between the outstretching state and the retracting state.

As can be shown in FIG. 14 and FIG. 17, the operating portion 33A further comprises an operating element 331 A, so as to facilitate the motor 334A to receive an operation signal, and then control the start and stop of the motor 334A.

In detail, the case body 21C defines an extending space 2100. The guiding member 32 is extended into the extending space 2100. In the relaxed state of the elastic element 34, the guiding member 32 is kept to a predetermined position in the extending space, so that the first limiting slot 321a and the second limiting slot 321b are respectively kept to corresponding positions, and the first positioning element 31a and the second positioning element 31b are respectively positioned to corresponding positions that makes the holding member 22 being retracted to the case body 21C.

When the operating element 331A is operated, the motor drives the screw 334A to rotate in the second counterclockwise direction around the first axis L1. The screw 334A drives the gear 332A to rotate in the first counterclockwise direction around the second axis L2, and the toothed bar structure 333A is driven to move in a positive direction of a first direction. The guiding member 32 integrally formed with the toothed bar structure 333A is driven to move to a second predetermined position in the positive direction of the first direction. The first limiting slot 321a drives the first positioning element 31a to move in the first limiting slot 321a, and the holding member 22 integrally connecting with the first positioning element 31a is driven to move away from the case body 21, so that the charging station is switched to the outstretching state.

Referring to FIG. 20 of the drawings, in the outstretching state of the charging station, the guiding member 32 is kept to the second predetermined position in the extending space 2100, so that the first limiting slot 321a and the second limiting slot 321b are respectively kept to corresponding positions, and the first positioning element 31a and the second positioning element 31b are respectively positioned to corresponding positions that makes the holding member 22 being outstretching from the case body 21.

When the operating element 331A is operated, the motor drives the screw 334A to rotate in the second clockwise direction around the first axis L1. The screw 334A drives the gear 332A to rotate in the first clockwise direction around the second axis L2, and the toothed bar structure 333A is driven to move in an opposite direction of the first direction. The guiding member 32 integrally formed with the toothed bar structure 333A is driven to move in the opposite direction of the first direction. The first limiting slot 321a drives the first positioning element 31a to move in the first limiting slot 321a, and the holding member 22 integrally connecting with the first positioning element 31a is driven to move to the case body 21, so that the charging station is switched to the retracting state.

According to this fourth preferred embodiment of the present invention, the second limiting slot 321b has a same shape with the first limiting slot 321a and the extending direction of the second limiting slot 321b is parallel to the extending direction of the first limiting slot 321a. When the guiding member 32 is driven to move in the positive direction of the first direction. The second limiting slot 321b drives the second positioning element 31b to move in the second limiting slot 321b, and the holding member 22 integrally connecting with the first positioning element 31a and the second positioning element 31b is driven to move away from the case body 21 under the combined effect of the first positioning element 31a and the second positioning element 31b, so that the charging station is switched to the outstretching state, and the holding room 200 suitable for holding the second electrical device is formed.

In the outstretching state of the charging station, the elastic element 34 is in a stretched state and has a tendency to recover. After the second electrical device is put into the holding room, the elastic element 34 having the recover tendency provides a pulling force to the operating element 331. Under the linkage of the elastic element 34, the operating portion 33, the guiding member 32, the first positioning element 31a and the second positioning element 31b, the holding member 22 has a tendency to retract to the case body 21C, so that the second electrical device can be held to the holding room 200 more firmly.

As can be shown in FIG. 41, the case body 21C defines a receiving groove 300. In the retracting state of the charging station, the holding member 22 is received into the receiving groove 300, so as to form the first charging surface 100a for keeping the first electrical device M1.

According to this fourth preferred embodiment of the present invention, the first electrical device M1 is magnetically kept to the first charging surface 100a. The third electrical device M3 is magnetically kept to the second charging surface 100B. In detail, the charging station form comprises at least one magnetic unit 40 that provides a magnetic attraction. According to this fourth preferred embodiment of the present invention, the charging station form comprises a first magnetic unit 40a and a second magnetic unit 40b.

It is worth mentioning that the first electrical device M1 is magnetic or is able to be attracted by the magnetic unit 40a. In other words, the first electrical device M1 comprises a magnetic mating member. In the retracting state of the charging station, under the action of the magnetic unit 40, the first electrical device M1 is kept to the first charging surface 100a.

Similarly, the third electrical device M3 is magnetic or is able to be attracted by the magnetic unit 40b. In other words, the third electrical device M3 comprises another magnetic mating member. Whether in the retracting state or the outstretching state of the charging station, under the action of the magnetic unit 40b, the third electrical device M3 is kept to the second charging surface 100B.

Referring to FIG. 43 of the drawings, the power supply member 10B comprises at least one power sending unit 11. According to this fourth preferred embodiment of the present invention, the power supply member 10B comprises a first power sending unit 11a and a second power sending unit 11b. In the retracting state, the first electrical device M1 kept to the first charging surface 100a is able to obtain power from the first power sending unit 11a. Whether in the outstretching state of in the retracting state, the third electrical device M3 kept to the second charging surface 100B is able to obtain power from the second power sending unit 11b. According to this fourth preferred embodiment of the present invention, the first power sending unit 11a is embodied as a first sending coil, and the second power sending unit 11b is embodied as a second sending coil.

The power supply member 10B further comprises at least one power getting unit 12B getting power from an external circuit. The first power sending unit 11a and the second power sending unit 11b are electrically connected with the power getting unit 12B respectively, so that the power supply member 10B is able to obtain the power from the external circuit and send the power to the electrical device kept to the case 20C, such as the first electrical device being kept to the first charging surface 100a, the second electrical device being held to the holding room 200, or the third electrical device being kept to the third charging surface 100B.

Referring to FIG. 30 and FIG. 31 of the drawings, the power supply member 10B further comprises at least one power storage unit 13 electrically connecting with both the power storage unit 13 and the power sending unit 11. Power got by the power getting unit 12B can be stored to the power storage unit 13. The power sending unit 11 obtains power from the power storage unit 13 and sends power to the electrical devices.

It is worth mentioning that, when the power getting unit 12B is electrically disconnected from the external circuit, the power sending unit 11 still can obtains power storage to the power storage unit 13 and sends power to the electrical device.

According to this fourth preferred embodiment of the present invention, the power supply member 10B comprises a first power storage unit 13a and a second power storage unit 13b. The first power storage unit 13a is electrically connected with both the power getting unit 12B and the first power sending unit 11a. The second power storage unit 13b is electrically connected with both the power getting unit 12B and the second power sending unit 11b. Power got by the power getting unit 12B can be stored to the first power storage unit 13a and the second power storage unit 13b. The first power sending unit 11a obtains power from the first power storage unit 13a and sends power to the third electrical device M3. The second power sending unit 11b obtains power from the second power storage unit 13b and sends power to the first electrical device M1 or the second electrical device M2.

The charging station further comprises a wall-mounted member 50 coupled to the case body 21C, so that the charging station is able to be mounted to a wall W. Referring to FIG. 51 of the drawings, the charging station is side mounted to the wall. In the retracting station of the charging station, the first electrical device M1, such as a work light is kept to the first charging surface 100a. The work light that is kept to the first charging surface 100a and obtains power from the power supply member 10B is able to provide low-level lighting. A user who needs to take the work light to another place to use can take the work light from the charging station and catch the work light to where needed. At the same time, the third electrical device M3, such as another work light is attached to the second charging surface 100B.

Referring to FIG. 52 of the drawings, the charging station is side mounted to the wall. In the outstretching station of the charging station, the second electrical device M2, such as a mobile phone is held to the holding room 200. The mobile phone that is held to the holding room 200 and obtains power from the power supply member 10B is able to be obtained easily. When he/she working in a workshop needs to charge his/her mobile phone, he/she can conveniently place his/her mobile phone into the holding room 200. When he/she needs the mobile phone, he/she can easily take it away. At the same time, the third electrical device M3, such as another work light is kept to the second charging surface 100B.

Figure 42:
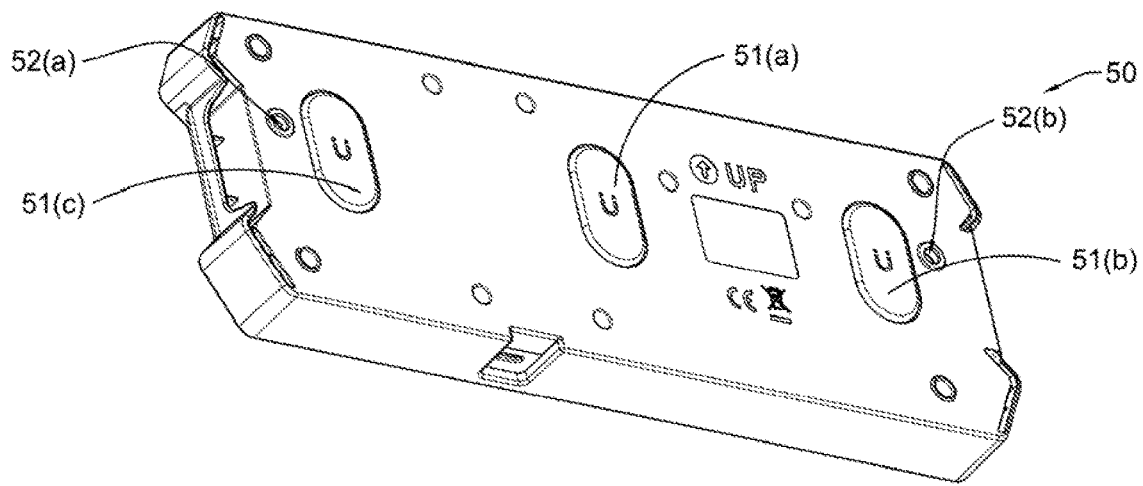
FIG. 42 is another perspective view of the charging station according to the above fourth preferred embodiment of the present invention.

Referring to FIG. 42 of the drawings, the wall-mounted member 50 comprises at least one magnetic element 51 fixed to the case body 21C, so that the charging station is capable of being magnetically installed to a magnetic wall or an iron wall.

As can be shown in FIG. 42 of the drawings, the wall-mounted member 50 further comprises at least one hole 52 formed to the case body 21C, so as to convenient the charging station to be installed on the wall by punching and fixing.

According to this fourth preferred embodiment of the present invention, the wall-mounted member 50 comprises a first magnetic element 51a, a second magnetic element 51b, a third magnetic element 51c, a first hole 52a, and a second hole 52b.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and are subject to change without departure from such principles. Therefore, this invention includes all modifications encompassed within the spirit and scope of the following claims.

What is claimed is:

1. A charging station for charging at least one first electrical device and at least one second electrical device, comprising:
a power supply member supplying power; and
a case comprising a case body and a holding member, wherein said case body has at least one charging surface, said power supply member suppling power is installed in said case body;
wherein said charging station has a retracting state and an outstretching state, wherein in the outstretching state, said holding member is outstretched from said case body to form a holding room between said charging surface and said holding member, so that the second electrical device being held in said holding room for receiving power from the power supply member, wherein in the retracting state, said holding member is retracted to said case body, so that the first electrical device is capable of being attached to the charging surface for receiving power from the power supply member.

2. The charging station, as recited in claim 1, further comprising a driving member, wherein said driving member is received in said case body, wherein said driving member operationally connected with said holding member, wherein when said driving member is moved out of said case body, the holding member is driven to outstretch from said case body by said driving member, wherein when said driving member is moved to said case body, holding member is driven to retract into said case body.

3. The charging station, as recited in claim 2, wherein said driving member further comprising a guiding member and at least a positioning element, wherein said positioning element is integrally protruded from said holding member, wherein said guiding member guides said at least a positioning element to move for guiding the holding member to switch between the retracting state and outstretching state.

4. The charging station, as recited in claim 3, wherein said guiding member has at least one limiting oblique slot, wherein said at least one positioning element is embedded into said at least one limiting oblique slot, wherein when said guiding member is driven to move, said at least one positioning element is guided to move in said at least one limiting oblique slot for driving said holding member to move.

5. The charging station, as recited in claim 4, wherein the moving direction of said guiding member and the moving direction of said holding member are vertical.

6. The charging station, as recited in claim 4, wherein the guiding member further comprises an operating portion, said operation portion is connected with an end portion of said guiding member, wherein said operation portion is located in a corner portion of said case body.

7. The charging station, as recited in claim 6, wherein said driving member further comprises an elastic element, wherein said elastic element is connected said operation portion and said case body, wherein said elastic element drives said guiding member move towards said case body so as to drive said holding member is to move towards said case body.

8. The charging station, as recited in claim 6, wherein said driving member further comprises a motor fixed on said case body, wherein said motor is on said guiding member for driving said guiding member to move.

9. The charging station, as recited in claim 8, wherein said guiding member further comprise a toothed bar structure located in a surface of said guiding member, wherein said driving member further comprises a gear, said gear is rotationally connected with said motor and said toothed bar structure, wherein said motor drives said guiding member to move through said gear rotating move on said toothed bar structure.

10. The charging station, as recited in claim 4, wherein said holding member further comprises a bearing base and a holding arm integrally connected to the bearing base, wherein said at least a positioning element is integrally protruded from said holding member.

11. The charging station, as recited in claim 10, wherein said bearing base further comprises at least one base arm, wherein said case body has at least one extending channel, said at least one base arm is passed through said at least one extending channel to connect to said guiding member.

12. The charging station, as recited in claim 7, wherein said holding member further comprises a bearing base and a holding arm integrally connected to the bearing base, wherein said at least a positioning element is integrally protruded from said holding member.

13. The charging station, as recited in claim 12, wherein said bearing base further comprises at least one base arm, wherein said case body has at least one extending channel, said at least one base arm is passed through said at least one extending channel to connect to said guiding member.

14. The charging station, as recited in claim 8, wherein said holding member further comprises a bearing base and a holding arm integrally connected to the bearing base, wherein said at least a positioning element is integrally protruded from said holding member.

15. The charging station, as recited in claim 14, wherein said bearing base further comprises at least one base arm, wherein said case body has at least one extending channel, said at least one base arm is passed through said at least one extending channel to connect to said guiding member.

16. The charging station, as recited in claim 10, wherein said case further comprises at least one reinforcing element connected with said case body and said holding member.

17. The charging station, as recited in claim 16, wherein said reinforcing element further defines a rotating hole and a sliding slot, wherein said rotation hole is connected to said case body, said sliding slot is connected to said holding member, wherein said holding member is move against said case body, said holding member sliding move along said sliding slot.

18. The charging station, as recited in claim 12, wherein said case further comprises at least one reinforcing element connected with said case body and said holding member.

19. The charging station, as recited in claim 18, wherein said reinforcing element further defines a rotating hole and a sliding slot, wherein said rotation hole is connected to said case body, said sliding slot is connected to said holding member, wherein said holding member is move against said case body, said holding member sliding move along said sliding slot.

20. The charging station, as recited in claim 10, wherein said holding arm has an outer surface, wherein said holding member in the retracting state, said outer surface of said holding arm are coplanar.

* * * * *